(12) United States Patent
Yao et al.

(10) Patent No.: US 6,970,882 B2
(45) Date of Patent: Nov. 29, 2005

(54) UNIFIED RELATIONAL DATABASE MODEL FOR DATA MINING SELECTED MODEL SCORING RESULTS, MODEL TRAINING RESULTS WHERE SELECTION IS BASED ON METADATA INCLUDED IN MINING MODEL CONTROL TABLE

(75) Inventors: Albert Zhongxing Yao, Austin, TX (US); Prasad Rajendra Vishnubhotla, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 548 days.

(21) Appl. No.: 10/116,588

(22) Filed: Apr. 4, 2002

(65) Prior Publication Data

US 2003/0195889 A1 Oct. 16, 2003

(51) Int. Cl.[7] .............................................. G06F 17/30
(52) U.S. Cl. .......................... 707/102; 707/7; 707/104.1
(58) Field of Search ..................... 707/1–10, 100–104.1; 706/45–50; 705/1–3, 10, 26–27

(56) References Cited

U.S. PATENT DOCUMENTS

| | | | | |
|---|---|---|---|---|
| 5,301,313 A | * | 4/1994 | Terada et al. ................... | 707/4 |
| 5,692,107 A | * | 11/1997 | Simoudis et al. .............. | 706/12 |
| 5,724,573 A | * | 3/1998 | Agrawal et al. ................ | 707/6 |
| 5,787,425 A | * | 7/1998 | Bigus ............................. | 707/6 |
| 6,034,697 A | * | 3/2000 | Becker ........................ | 345/606 |
| 6,044,366 A | * | 3/2000 | Graffe et al. ................... | 707/2 |
| 6,049,861 A | * | 4/2000 | Bird et al. ..................... | 712/28 |
| 6,112,209 A | * | 8/2000 | Gusack ........................ | 707/101 |
| 6,182,061 B1 | * | 1/2001 | Matsuzawa et al. ............ | 707/2 |
| 6,460,035 B1 | * | 10/2002 | Siegwart ......................... | 707/6 |
| 6,519,591 B1 | * | 2/2003 | Cereghini et al. .............. | 707/6 |
| 6,629,095 B1 | * | 9/2003 | Wagstaff et al. ................ | 707/5 |

(Continued)

FOREIGN PATENT DOCUMENTS

| | | | | |
|---|---|---|---|---|
| EP | 1172740 A2 | * | 1/2002 | ..................... 17/30 |
| WO | WO00/65481 | * | 11/2000 | ..................... 17/30 |

OTHER PUBLICATIONS

Wenke Lee et al. "a data mining framework for building intrusion detection models", security and privacy, 1999, proceddings of the symposium, May 1999, pp 120–132.*

Krzysztof Hauke, et al. "building data mining models in the Oracle 9i environment", Informing science Jun. 20031183–1191.*

S.Bayerl et al. "Applying models with scoring", Abstract only, 2002 WIT press, one page.*

Robert Grossman et al. The management and mining of multiple predictive models using the predictive modeling markup language(PMML), Information and software technology, vol 41, 1999 pp 589–595.*

(Continued)

Primary Examiner—Srirama Channavajjala
(74) Attorney, Agent, or Firm—John R. Biggers; Mark S. Walker; Biggers & Ohanian, LLP

(57) ABSTRACT

Managing data mining activities in a data mining environment, including selecting a model scoring results table, wherein the selecting is carried out in dependence upon metadata included in a model scoring results control table, the model scoring results control table being related to a data set control table including data set metadata; reading a scoring output data record from the selected model scoring results table; storing the scoring output data record in a managed representation table for scoring results; selecting a model training results file, wherein the selecting is carried out in dependence upon metadata included in a mining model control table; reading training results data from the selected model training results file; and storing the training results data in a model training results table, the model training results table comprising a relational representation of the training results data from the selected model training results file.

78 Claims, 15 Drawing Sheets

U.S. PATENT DOCUMENTS

| | | | |
|---|---|---|---|
| 6,677,963 B1 * | 1/2004 | Mani et al. | 345/764 |
| 6,691,120 B1 * | 2/2004 | Durrant et al. | 707/100 |
| 6,718,338 B2 * | 4/2004 | Vishnubhotla | 707/102 |
| 6,721,749 B1 * | 4/2004 | Najm et al. | 707/100 |
| 2002/0077790 A1 * | 6/2002 | Bisgaard-Bohr et al. | 703/2 |
| 2002/0078064 A1 * | 6/2002 | Bisgaard-Bohr et al. | 707/103 R |
| 2002/0083067 A1 * | 6/2002 | Tamayo et al. | 707/100 |
| 2002/0158636 A1 * | 10/2002 | Tyan et al. | 324/500 |
| 2003/0177054 A1 * | 9/2003 | Reinbold et al. | 705/10 |
| 2003/0182310 A1 * | 9/2003 | Charnock et al. | 707/104.1 |
| 2003/0191727 A1 * | 10/2003 | Yao et al. | 706/20 |
| 2003/0208488 A1 * | 11/2003 | Perrizo | 707/6 |
| 2003/0212678 A1 * | 11/2003 | Bloom et al. | 707/6 |
| 2003/0212691 A1 * | 11/2003 | Kuntala et al. | 707/100 |
| 2003/0212713 A1 * | 11/2003 | Campos et al. | 707/200 |
| 2003/0229635 A1 * | 12/2003 | Chaudhuri et al. | 707/6 |

OTHER PUBLICATIONS

Robert Grossman, Three trends in predictive modeling, Sep. 2002, 3 pages.*

Sanjay Soni et al., "Performance study of Microsoft data mining algorithms", updated Mar. 25, 2002, Microsoft Technet, 25 pages.*

Kurt Thearling, et al. "Visualizing data mining models", 2001 14 pages.*

Du Zhang et al. "Mining california vital statistics data", proceedings of the 2001 IEEE international conference on data mining pp1–2.*

GJ Williams, Integrated delivery of large scale data mining systems (Extended abstract) 2 pages.*

Qin Ding et al. "A model for multi–relational data mining on demand forecasting"5 pages.*

Tim Oates et al., "Parallel and distributed search for structure in multivariate time series" proceedings of the ninth european conference on Machine learning, 1996, pp1–15.*

S. Wesley changchien et al. Mining association rules procedure to support on–line recommendation by customers and product fragmentation, expert system with applications 20 (2000) pp 325–335.*

Vaclav Lin et al., "Content–based retrieval of analytic reports", 6 pages.*

Robert Grossman et al. Data mining for scientific and engineering applications, chapter 10–data mining systems 44 pages.*

John F elder IV et al. "A comparison of leading data mining tools", fourth international conference on knowledge discovery and data mining, Aug. 28, 1998 31 pages.*

* cited by examiner

| Data Set Control Table Structure |||
|---|---|---|
| Column Name | Data Type | Column Description |
| data_id | Integer Not Null | Unique ID for a data set (Primary Key) |
| data_name | Varchar(32), Not Null | The name of this data set.<br>• The name of the table/view (for table/view)<br>• The name of the file (for files) |
| data_desc | Varchar(254) | Description of this data set |
| data_type | Integer | Type of the data set. 0 – table, 1 – view, or 2 – file |
| usage_type | Integer | Usage of the data set. 0 – input, 1 – output, 2 – input/output |
| data_location | Varchar(254), Not Null | • The database name (for table/view)<br>• The full file path (for files) |

Figure 2

300
Mining Model Control Table Structure

| Column Name | Data Type | Column Description |
|---|---|---|
| model_id | Integer, Not Null | Unique ID for the data mining model. (Primary Key) |
| model_name | Varchar(32) | The name of the data mining model. |
| model_desc | Varchar(254) | The description of the data mining model. |
| model_type | Integer | The type of the data mining model. |
| model_alg | Integer | The ID of the algorithm used for training the data mining model. |
| train_input_data_id | Integer, Not Null | The ID of the model training input data set used to train the data mining model. (Foreign Key) |
| date_id | Integer | The date when the data mining model was last trained. |
| train_result_file_id | Integer, Not Null | The ID of the model training results file for the data mining model as it is registered as a data source. (Foreign Key) |
| train_result_file_name | Varchar(32) | The name of the model training results file for the data mining model in PMML format. |
| file_location | Varchar(254) | The location where the model training results data set for the data mining model is saved. |

Figure 3

|  | Model Scoring Results Control Table Structure | | |
|---|---|---|---|
|  | Column Name | Data Type | Column Description |
| 402 | scoring_results_table_id | Integer, Not Null | The ID of the output data set table that holds the scoring results. (Primary Key) (Foreign Key |
| 404 | model_id | Integer, Not Null | The ID of the data mining model used for scoring. (Primary Key) (Foreign Key) |
| 406 | scoring_input_data_id | Integer | The ID of the input data set which is used as the input for the model scoring. (Primary Key) (Foreign Key) |
| 408 | scoring_results_table_name | Varchar(32), Not Null | Name of the output data set table which holds the scoring results. |
| 410 | scoring_setting_name | Varchar(32) | The name of the setting used for executing this scoring operation. |
| 412 | scoring_status | Char(1) | Status of whether the scoring output data set table is actively used. 0 – inactive, 1 - active |

500
Managed Representation Table for Scoring Results Structure

| Column Name | Data Type | Column Description |
|---|---|---|
| record_id | Integer, Not Null | The primary key for a record in the unmanaged scoring result table. |
| model_id | Integer, Not Null | The identification of the data mining model used for scoring. |
| scoring_input_data_id | Integer, Not Null | The identification of the input data set used for generating this model scoring result. |
| scoring_results_table_id | Integer, Not Null | The identification of the table that holds the model scoring results. |
| cluster_id | Integer | The numerical index of the best fitting cluster. |
| score | Double | The score of fitting quality of the record to the best fitting cluster. |
| cluster2_id | Integer | The numerical index of the second best fitting cluster. |
| score2 | Double | The score of the fitting quality of the record to the second best fitting cluster. |
| confidence | Double | The confidence of the cluster assignment of the record. |

Figure 5

| Relational Clustering Record ||| 
|---|---|---|
| Column Name | Data Type | Column Description |
| clustering_id | Integer, Not Null | Unique identifier for the clustering. |
| clustering_name | Varchar(64) | Text name for the clustering. |
| clustering_desc | Varchar(254) | Description of the purpose of the clustering. |
| clustering_type | Integer | Type of clustering. (demographic or neutral) |
| num_clusters | Integer | Number of clusters given by the clustering. |
| num_attributes | Integer | Number of attributes considered in clustering. |
| clustering_alg | Integer | Clustering algorithm used. |
| num_items | Integer | Number of data items input to the clustering. |

| Relational Cluster Record | | |
|---|---|---|
| Column Name | Data Type | Column Description |
| cluster_id | Integer, Not Null | Unique identifier for the cluster. |
| clustering_id | Integer, Not Null | ID of the clustering to which the cluster belongs. |
| cluster_index | Integer | Ordinal number of the cluster. |
| cluster_name | Varchar(64) | Text name for the cluster. |
| cluster_desc | Varchar(256) | Description of the purpose of the cluster. |
| num_items | Integer | Number of data items in the cluster. |

802 — cluster_id
804 — clustering_id
806 — cluster_index
808 — cluster_name
810 — cluster_desc
812 — num_items

| Relational Cluster Attribute Record |||
| Column Name | Data Type | Column Description |
| --- | --- | --- |
| attribute_id | Integer, Not Null | Unique identifier for the attribute. |
| clustering_id | Integer, Not Null | ID of the clustering to which the attribute instance belongs. |
| cluster_id | Integer, Not Null | ID of the cluster to which the attribute instance belongs. |
| attribute_type | Integer | Type of attribute. (Categorical, Continuous) |
| attribute_name | Varchar(32), Not Null | Text name of the attribute. |
| attribute_desc | Varchar(254) | Description of the attribute. |
| active_sup_type | Integer | Whether the attribute is used as active or supplementary. |
| num_categories | Integer | Number of categories – in the case of categorical attributes. |
| from_range | Double | Lowest value allowed – in the case of continuous attributes. |
| to_range | Double | Highest value allowed – in the case of continuous attributes. |
| num_items | Integer | Number of data items. |

902 — attribute_id
904 — clustering_id
906 — cluster_id
908 — attribute_type
910 — attribute_name
912 — attribute_desc
914 — active_sup_type
916 — num_categories
918 — from_range
920 — to_range
922 — num_items

Figure 9

| \#1000 Relational Cluster Attribute Bin Record |||
|---|---|---|
| Column Name | Data Type | Column Description |
| bin_id | Integer, Not Null | Unique identifier for the attribute bin. |
| clustering_id | Integer, Not Null | ID of the clustering to which the attribute bin belongs. |
| cluster_id | Integer, Not Null | ID of the cluster to which the attribute bin belongs. |
| attribute_id | Integer, Not Null | ID of the attribute to which the attribute bin belongs. |
| bin_name | Varchar(64) | Text name of the attribute bin. |
| category_name | Varchar(64) | Category name – in the case of categorical attribute. |
| from_range | Double | Lowest value in the bin. |
| to_range | Double | Highest value in the bin. |
| num_items | Integer | Number of items. |
| value_sum | Double | Sum of the values in the bin (as a statistical measure). |
| value_sqr_sum | Double | Sum of the squares of values in the bin (as a statistical measure). |

Figure 10

Data Set Control Table 106

| data_id (202) | data_name (204) | data_type (208) | usage_type (210) | data_desc (206) | data_location (212) |
|---|---|---|---|---|---|
| 1,001 | wcamng.initchar | 0 | 0 | Summary input table for initiative related characteristics. | wcamart |
| 1,002 | wcainitchar12.xml | 2 | 2 | Training results for the data mining model in PMML format. | d:\mining\data |
| 1,003 | wcamng.initapp12 | 0 | 1 | Scoring output data set for scoring results. | wcamart |
| 2,001 | wcamng.membsums | 0 | 0 | Summary input table for member related characteristics. | wcamart |
| 2,002 | wcamng.membsumsamp | 0 | 0 | Sample data set used as input data set for training the data mining model. | wcamart |
| 2,003 | wcamembchar22.xml | 2 | 2 | Training results data set for the data mining model in PMML format. | d:\mining\data |
| 2,004 | wcamng.memapp22 | 0 | 1 | Scoring output data set for scoring results. | wcamart |

Figure 11

Mining Model Control Table 118

| model_id 302 | model_name 304 | model_type 308 | model_alg 310 | model_desc 306 | train_input_data_id 312 | date_id 314 | train_result_file_id 316 | train_result_file_name 318 | file_location 320 |
|---|---|---|---|---|---|---|---|---|---|
| 1,101 | wcainit-char12 | 1 | 0 | Relationship between shoppers and total order values | 1,001 | 0101 2002 | 1,002 | wcainitchar 12.xml | d:\mining\ data |
| 1,201 | wcamemb-char22 | 1 | 0 | Relationship between shoppers and total order values | 2,002 | 0101 2002 | 2,003 | wcamemb-char22.xml | d:\mining\ data |

Figure 12

Scoring Results Control Table (130)

| scoring_results_table_id (402) | model_id (404) | scoring_input_data_id (406) | scoring_results_table_name (408) | scoring_setting_name (410) | scoring_status (412) |
|---|---|---|---|---|---|
| 1,003 | 1,101 | 1,001 | wcamng.initapp12 | wcainitchar12a | 1 |
| 2,004 | 1,201 | 2,001 | wcamng.memapp22 | wcamembchar22a | 1 |

Figure 13

Clustering Table

| clustering _id 702 | clustering _name 704 | clustering _type 708 | clustering _alg 714 | clustering_desc 706 | num_ clusters 710 | num_ attributes 712 | num_ items 716 |
|---|---|---|---|---|---|---|---|
| 1,101 | wcainitchar12 | 1 | 0 | What are the characteristics of initiatives that are most successful | 4 | 9 | 100 |
| 2,101 | wcamembchar22 | 1 | 0 | What are the characteristics of customers that respond most favorably to initiative | 2 | 15 | 5,024 |

Figure 14

Managed Representation Table 148

| record_id 502 | model_id 504 | scoring_input_data_id 506 | scoring_results_table_id 508 | cluster_id 510 | score 512 | cluster2_id 514 | score2 516 | confidence 518 |
|---|---|---|---|---|---|---|---|---|
| 10,009 | 1,101 | 1,001 | 1,003 | 0 | 1 | 2 | 0 | 1.5 |
| 10,010 | 1,101 | 1,001 | 1,003 | 1 | 1 | 2 | 0 | 1.5 |
| 10,011 | 1,101 | 1,001 | 1,003 | 2 | 1 | 5 | 0 | 1.5 |
| 10,012 | 1,101 | 1,001 | 1,003 | 3 | 1 | 2 | 0 | 1.5 |
| 10,014 | 1,101 | 1,001 | 1,003 | 4 | 1 | 2 | 0 | 1.5 |
| 10,016 | 1,101 | 1,001 | 1,003 | 5 | 1 | 2 | 0 | 1.5 |
| 9,889 | 1,201 | 2,001 | 2,004 | 1 | 0.65 | 0 | 0.2 | 0.94 |
| 9,939 | 1,201 | 2,001 | 2,004 | 0 | 0.89 | 1 | 0.38 | 1.02 |
| 9,990 | 1,201 | 2,001 | 2,004 | 1 | 0.74 | 0 | 0.33 | 0.9 |
| 10,039 | 1,201 | 2,001 | 2,004 | 0 | 0.88 | 1 | 0.35 | 1.04 |
| 10,040 | 1,201 | 2,001 | 2,004 | 1 | 0.79 | 0 | 0.44 | 0.85 |
| 10,041 | 1,201 | 2,001 | 2,004 | 1 | 0.78 | 0 | 0.44 | 0.84 |
| 10,042 | 1,201 | 2,001 | 2,004 | 0 | 0.88 | 1 | 0.35 | 1.04 |
| 10,043 | 1,201 | 2,001 | 2,004 | 1 | 0.8 | 0 | 0.44 | 0.86 |

Figure 15

UNIFIED RELATIONAL DATABASE MODEL FOR DATA MINING SELECTED MODEL SCORING RESULTS, MODEL TRAINING RESULTS WHERE SELECTION IS BASED ON METADATA INCLUDED IN MINING MODEL CONTROL TABLE

BACKGROUND OF THE INVENTION

1. Field of the Invention

The field of the invention is data processing, or, more specifically, methods, systems, and products for managing data mining activities in a data mining environment.

2. Description of Related Art

Data mining is an analytic technique to dynamically discover patterns in historical data records and to apply properties associated with these records to production data records that exhibit similar patterns. Based on historical data, a data mining algorithm first generates a data mining model that captures the discovered patterns; this activity is called "model training." The data mining model so generated is then applied on production data; this activity is called "model scoring."

Data mining tools such as IBM's Intelligent Miner are used directly in customer environments by connecting the tool to customer's historical and production databases. As a result, any structural change to the historical and production databases (such as renaming tables and columns or reorganizing the columns across tables) is likely to throw the data mining activity off balance and make it disfunctional. Rectifying this often requires a lot of changes in the data mining activity because of its direct dependency on the names used in historical and production data.

To manage data mining activities in an analytic application, one needs to deal with several different types of data structures, including input data for model training and model scoring, results from model training, output data from model scoring, and metadata to manage models and model results. In current practice, definition of input data for model training and scoring is left to the end user, a tool specific proprietary internal representation is used for model training results, definition of output data from model scoring is left to the end user, and there is hardly any support for control data to manage models and model results, although it would be advantageous if there were. It would be advantageous to have a database model that includes a set of tables describing the tables containing historical data and production data.

SUMMARY OF THE INVENTION

This disclosure presents exemplary embodiments of a database model typically comprising a set of tables that describe which tables contain historical data and which tables contain production data. This approach makes the data mining activity easily pluggable into different customer environments. In addition to information about input/output data, embodiments of the database model maintain information about the mining models themselves, thereby simplifying the management of mining models.

Embodiments of the present invention typically implement a unified relational database model to represent all the various types of data structures needed to manage data mining activities in an analytic environment. In this disclosure, we sometimes refer to exemplary embodiments of unified relational database models of the present invention as "unified systems." In this discussion, we often illustrate unified systems by focusing on a particular data mining algorithm called "clustering," also sometime called "segmentation," and by showing how a relational database model may be defined for capturing the input, results, output and control data of this algorithm in an analytic application.

Exemplary embodiments of the invention typically include methods for managing data mining activities in a data mining environment, in which the data mining environment typically includes data sets, a data mining tool and a data mining model. In such embodiments, the data mining tool trains the data mining model using input data sets to create model training results and store the model training results in model training results files, and scores scoring input data sets using the model training results to produce scoring output data and store the scoring output data in records in model scoring results tables. Exemplary embodiments typically include selecting a model scoring results table, wherein the selecting is carried out in dependence upon metadata included in a model scoring results control table, the model scoring results control table being related to a data set control table including data set metadata. Such exemplary embodiments typically include reading a scoring output data record from the selected model scoring results table and storing the scoring output data record in a managed representation table for scoring results.

Exemplary embodiments also typically include selecting a model training results file, wherein the selecting is carried out in dependence upon metadata included in a mining model control table, the mining model control table being related to the data set control table and the model scoring results control table. Such embodiments typically include reading training results data from the selected model training results file and storing the training results data in at least one model training results table, the at least one model training results table comprising a relational representation of the training results data from the selected model training results file, one of the at least one model training results table referencing the mining model control table. In such typical embodiments, the managed representation table for scoring results is related to the referencing model training results table, the data set control table, the mining model control table, and the model scoring results control table.

In exemplary embodiments, a data set control table typically includes an identification number for each data set, a name for each data set, and a description for each data set. In such embodiments, the data set control table typically includes a type for each data set, a usage for each data set, and a location for each data set.

In exemplary embodiments, the mining model control table includes an identification number for the data mining model, a model name for the data mining model, a description for the data mining model, and a model type for the data mining model. In such embodiments, the mining model control table also includes an algorithm used for training the data mining model, an identification number for a model training input data set used by the data mining tool to train the data mining model, and a date the data mining model was last trained. In such embodiments, the mining model control table typically includes an identification number for a model training results file for the data mining model, a file name for the model training results file for the data mining model, and a file location for the model training results file for the data mining model.

In exemplary embodiments of the invention, the model scoring results control table typically includes an identification number for each model scoring results table and an identification number for the data mining model used for the model scoring results table. In such embodiments, the model scoring results control table typically includes an identification number for a scoring input data set for the model scoring results table, and a name for the model scoring results table. In such embodiments, the model scoring results control table typically includes a name for a scoring setting, and a scoring status indicating whether the model scoring results table is actively used.

In typical embodiments, a managed representation table for scoring results typically includes an identification number for each record in each selected model scoring results table and an identification number for each data mining model used for scoring. In such embodiments, the managed representation table for scoring results typically includes an identification number for each scoring input data set, an identification number for each model scoring results table, and model scoring results data from each selected model scoring results table.

In exemplary embodiments, a data mining model is typically a clustering model and the data mining tool typically scores scoring input data sets using the clustering model to produce scoring output data records, to establish clusters, to select from the clusters a best fitting cluster and a second best fitting cluster, to score the fitting quality of each record to the best fitting cluster, to score the fitting quality of each record to the second best fitting cluster, and to establish a confidence value of the cluster assignment of each record. In such embodiments, the managed representation table for scoring results typically includes, for each record, a numerical index for the best fitting cluster, and a score of the fitting quality of the record to the best fitting cluster. In such embodiments, the managed representation table for scoring results typically includes, for each record, a numerical index for the second best fitting cluster, a score of the fitting quality of the record to the second best filling cluster, and a confidence value of the cluster assignment of the record.

In exemplary embodiments of the invention, a data mining model is a clustering model and the data mining tool typically scores scoring input data sets using the clustering model to produce scoring output data records. In such embodiments, the managed representation table mining model foreign key typically includes a model identification column in the managed representation table for scoring results in which is stored content from the clustering model identification column in the at least one model training results table, and the managed representation table for scoring results typically relates to the at least one model training result table through the managed representation table mining model foreign key.

In exemplary embodiments of the invention, each model scoring results table typically includes a record identification number column in which is stored an identification number for each record in the model scoring results table. In such embodiments, the managed representation table for scoring results typically includes a record identification column in which the identification number for each record from each selected model scoring results table is stored. In such embodiments, the identification numbers are typically those identification numbers stored in the model scoring results table record identification column.

In exemplary embodiments, the selected model training results file typically includes a hierarchical representation of the model training results. In exemplary embodiments, the data mining model is typically a clustering model, the selected model training results file typically includes a hierarchical representation of model training results, and the at least one model training results table typically includes a clustering table, a cluster table, a cluster attribute table and a cluster attribute bin table. In such embodiments, reading the training results data from the selected model training results file in a model training results table typically includes reading, from a hierarchical clustering node embodied in the hierarchical representation of model training results, clustering data describing a clustering, and storing the clustering data in a relational clustering record in the clustering table. In such embodiments, the relational clustering record typically includes a clustering identification field in which is stored content from a model identification field in the mining model control table, the clustering table relating to the mining model control table through the clustering identification field. In such embodiments, the managed representation table typically includes a model identification field in which is stored content from the clustering identification field in the clustering table and from a model identification field in the mining model control table, the managed representation table for scoring results relating to the clustering table and to the mining model control table through the managed representation table model identification key.

In exemplary embodiments, reading the training results data from a selected model training results file in a model training results table typically includes reading, from a hierarchical cluster node embodied in the hierarchical representation of model training results, cluster data describing a cluster, and storing the cluster data in a relational cluster record in the cluster table. In such embodiments, the hierarchical cluster node is typically embodied in a position in the hierarchy below the hierarchical clustering node, the relational cluster record is typically related to the relational clustering record through a first foreign key including the clustering identification field, and the relational cluster record typically includes a cluster identification field.

In exemplary embodiments, reading the training results data from a selected model training results file in a model training results table typically includes reading, from a hierarchical cluster attribute node embodied in the hierarchical representation of model training results, cluster attribute data describing a cluster attribute, and storing the cluster attribute data in a relational cluster attribute record in the cluster attribute table. In such embodiments, the hierarchical cluster attribute node is typically embodied in a position in the hierarchy below the hierarchical cluster node, the relational cluster attribute record is typically related to the relational cluster record through a second foreign key comprising the cluster identification field, the relational cluster attribute record is typically related to the relational clustering record through a third foreign key comprising the clustering identification field, and the relational cluster attribute record typically includes a cluster attribute identification field.

In further embodiments, reading the training results data from the selected model training results file in a model training results table typically includes reading, from a hierarchical cluster attribute bin node embodied in the hierarchical representation of model training results, cluster attribute bin data describing a cluster attribute bin, and storing the cluster attribute bin data in a relational cluster attribute bin record in the cluster attribute bin table. In such embodiments, the hierarchical cluster attribute bin node is typically embodied in a position in the hierarchy below the hierarchical cluster attribute node, the relational cluster attribute bin record is typically related to the relational cluster attribute record through a fourth foreign key comprising the cluster attribute identification field, the relational cluster attribute bin record is typically related to the relational cluster record through a fifth foreign key comprising the cluster identification field, and the relational cluster attribute bin record is typically related to the relational clustering record through a sixth foreign key comprising the clustering identification field.

In exemplary embodiments of the invention, clustering data as recorded in the relational clustering record typically includes a unique identifier for the relational clustering record, a text name for the relational clustering record, and a text description of the purpose of a clustering represented by the relational clustering record. In such embodiments, the clustering data typically includes a clustering type, a number of clusters given by the clustering, and a number of attributes considered in the clustering. In such embodiments, the clustering data typically includes an algorithm field identifying the clustering algorithm used in the clustering, and an items numeric field that stores the number of data items input to the clustering from the scoring input data set.

In exemplary embodiments, cluster data as recorded in a relational cluster record typically includes a unique identifier for the cluster, and a unique identifier of a relational clustering record to which the relational cluster record related. In some embodiments, the cluster data typically includes an ordinal number of the relational cluster record, and a text name for the cluster represented by the relational cluster record. In such embodiments, the cluster data typically includes a text description of the purpose of the cluster represented by the relational cluster record, and a numeric field identifying the number of data items from the scoring input data set that are represented in records related to the relational cluster record.

In exemplary embodiments of the invention, cluster attribute data as recorded in the relational cluster attribute record typically includes a unique identifier of the relational cluster attribute record, a unique identifier of a relational clusteringrecord to which the relational cluster attribute record is related, a unique identifier of a relational cluster record to which the relational cluster attribute record is related, and an attribute type. In such embodiments, the cluster attribute data typically includes a text name of a relational cluster attribute represented by the relational cluster attribute record, a text description of the relational cluster attribute, a use type field, and a categories numeric field indicating a number of categories associated with the cluster attribute when the attribute type has the value "categorical." In such embodiments, the cluster attribute data typically includes a lowest value numeric field indicating a lowest value allowed when the attribute type has the value "continuous," a highest value numeric field indicating a highest value allowed when the attribute type has the value "continuous," and an items numeric field identifying the number of data items from the scoring input data set that are represented in records related to the relational cluster attribute record.

In exemplary embodiments, the cluster attribute bin data as recorded in the relational cluster attribute bin record typically includes a unique identifier of the attribute bin, a unique identifier of a relational clustering record to which the relational attribute bin record is related, and a unique identifier of a relational cluster record to which the relational attribute bin record is related. In such embodiments, the relational cluster attribute bin record typically includes a unique identifier of a relational attribute record to which the relational attribute bin record is related, a text name for the attribute bin represented by the relational attribute bin record, a category name, and a lowest value numeric field in which is stored the lowest value in the bin. In such embodiments, the relational cluster attribute bin record typically includes a highest value numeric record in which is stored the highest value in the bin, an items numeric field in which is stored the number of items in the bin, a values sum numeric field in which is stored the sum of the values in the bin, and a squares numeric field in which is stored the sum of the squares of values in the bin.

In exemplary embodiments of the invention, the mining model control table is typically related to the data set control table through a mining model control table data set foreign key and the model scoring results table is typically related to the data set control table through a model scoring results table data set foreign key and to the mining model control table through a model scoring results table mining model foreign key. In such embodiments, the managed representation table for scoring results is typically related to the data set control table through a managed representation table data set foreign key, to the mining model control table through a managed representation table mining model foreign key, and to the model scoring results control table through a managed representation table model scoring results foreign key. Further, in such embodiments, the referencing model training results table typically references the mining model control table through a model training results table foreign key, and the managed representation table for scoring results is typically related to the referencing model training results table through a managed representation table training results foreign key.

In exemplary embodiments of the invention, a mining model control table foreign key typically includes a model training input data set identification column in the mining model control table in which is stored content from a data set identification column of the data set control table, the mining model control table relating to the data set control table through the foreign key. In such embodiments, the mining model control table foreign key typically includes a model training results file identification column in the mining model control table in which is stored content from a data set identification column of the data set control table, the mining model control table relating to the data set control table through the foreign key. In such embodiments, the model scoring results control table data set foreign key typically includes a model scoring results table identification column in the model scoring results control table in which is stored content from a data set identification column of the data set control table, the model scoring results control table relating to the data set control table through the foreign key.

In exemplary embodiments, a model scoring results control table data set foreign key typically includes a scoring input data set identification column in the model scoring results control table in which is stored content from a data set identification column of the data set control table, the model scoring results control table relating to the data set control table through the foreign key. In such embodiments, the model scoring results control table mining model foreign key typically includes a model identification column in the model scoring results control table in which is stored content from a model identification column of the mining model control table, the model scoring results control table relating to the mining model control table through the foreign key. In such embodiments, the managed representation table data set foreign key typically includes a model scoring input data set identification column in the managed representation table for scoring results in which is stored content from a data set identification column of the data set control table, the managed representation table for scoring results relating to the data set control table through the managed representation table data set foreign key. In typical embodiments, the managed representation table mining model foreign key typically includes a model identification column in the managed representation table for scoring results in which is stored content from a model identification column of the mining model control table, the managed representation table for scoring results relating to the mining model control table through the managed representation table mining model foreign key.

In exemplary embodiments of the invention, a managed representation table model scoring results foreign key typically includes a scoring input data set identification column in the managed representation table for scoring results in which is stored content from a scoring input data set identification column of the model scoring results control table, and a model identification column in the managed representation table for scoring results in which is stored content from a model identification column of the model scoring results control table. In such embodiments, the managed representation table model scoring results foreign key typically includes a model scoring results table identification column in the managed representation table for scoring results in which is stored content from a model scoring results table identification column of the model scoring results control table, and the managed representation table for scoring results relating to the model scoring results control table through the managed representation table model scoring results foreign key.

In exemplary embodiments, a model training results table foreign key typically includes a model identification column in one of the at least one model training results table in which is stored content from a model identification column of the mining model control table, the model training results table relating to the mining model control table through the model training results table foreign key. In such embodiments, the managed representation table training results foreign key typically includes a model identification column in the managed representation table for scoring results in which is stored content from a model identification column in one of the at least one model training results tables. In many exemplary embodiments, the model training results file is in Predictive Model Markup Language format.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 2 depicts an example of an embodiment of a metadata table structure for a data set control table.

FIG. 3 depicts an example of an embodiment of a metadata table structure for a mining model control table.

FIG. 4 shows an example of an embodiment of a metadata table structure for a scoring results control table.

FIG. 5 shows an example of an embodiment of a table structure for a managed representation table for scoring results.

FIG. 7 shows an example of an embodiment of a relational clustering record.

FIG. 8 shows an example of an embodiment of a relational cluster record.

FIG. 9 shows an example of an embodiment of a relational cluster attribute record.

FIG. 10 shows an example of an embodiment of a relational cluster attribute bin record.

FIG. 11 is an example illustration of an embodiment of a data set control table.

FIG. 12 is an example illustration of an embodiment of a mining model control table.

FIG. 13 is an example illustration of an embodiment of a scoring results control table.

FIG. 14 is an example illustration of an embodiment of a relational clustering table.

FIG. 15 is an example illustration of an embodiment of a managed representation table.

DETAILED DESCRIPTION OF EXEMPLARY EMBODIMENTS

Introduction

Figure 1:
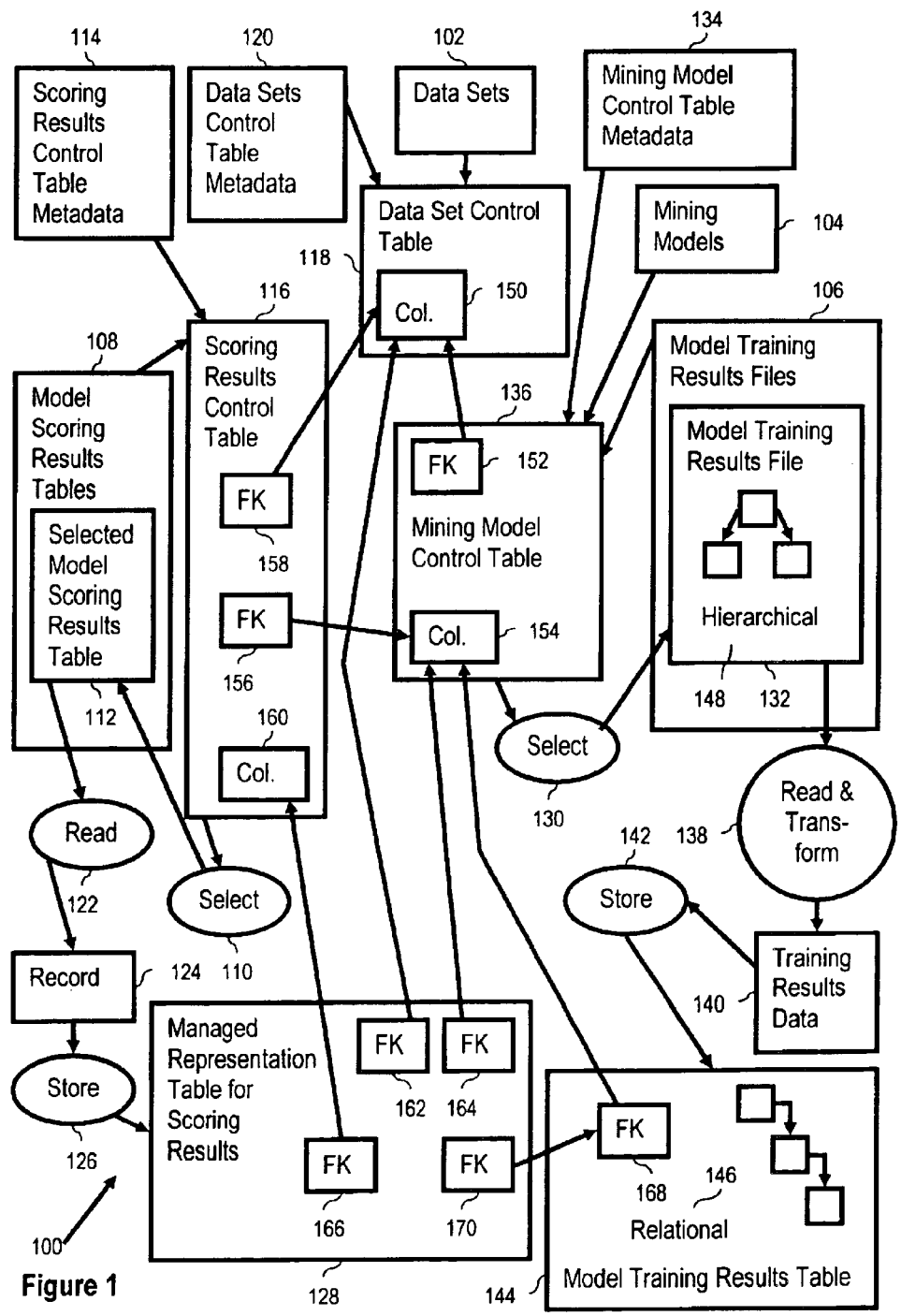
FIG. 1 is a general process flow diagram illustrating a typical example embodiment of the present invention.

The present invention is described to a large extent in this specification in terms of methods for managing data mining activities in a data mining environment. Persons skilled in the art, however, will recognize that any computer system that includes suitable programming means for operating in accordance with the disclosed methods also falls well within the scope of the present invention.

Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit. The invention also may be embodied in a computer program product, such as a diskette or other recording medium, for use with any suitable data processing system.

Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Definitions

In this specification, the terms "field" and "data element" are used as synonyms referring to individual elements of digital data. Aggregates of data elements are referred to as "records" or "data structures." Aggregates of records are referred to as "tables" or "files." Aggregates of tables are referred to as "databases." Aggregates of related records and tables are called "relational databases." Records and fields in a table in a database are sometimes referred to respectively as "rows" and "columns."

A "view" is a virtual table arising during the use of database software as the software selects data from permanent tables in the database. The view has columns and rows giving the appearance of a table. The view is not permanent.

A "primary key" is a column or group of columns in a table having unique values in each row.

A "foreign key" is a column in a first table (the "referencing" or "child" table) that identifies a column in a second table (the "referenced" or "parent" table). When such a foreign key is present the two tables are said to be "related."

The term "attribute" is used in this specification only to refer to the cluster attribute records comprising results of data mining operations. It is common to use the term "attribute" as a synonym for "field" and "data element," but "attribute" in this specification is used only to refer to attribute records in data mining results typically in phrases such as "cluster attribute" or "cluster attribute bin," referring to these particular kinds of data structures in data mining results.

The "Structured Query Language," or "SQL," is an industry-standard query language. The industry-standard SQL Data Definition Language ("DDL") is often used to create data schema or record structures for inclusion in data stores or files. In this specification, scripts operable as DDL scripts for creating record structures in tables are referred to as DDL scripts or as SQL scripts or as SQL DDL scripts.

"IBM DB2 Universal Database," or "DB2," is a family of relational database products offered by IBM. "DB2 Call Level Interface," or "DB2 CLI," is IBM's callable SQL interface to the DB2 family of database servers, and is an "application programming interface" ("API") for relational database access. DB2 CLI is based on the Microsoft "Open Database Connectivity" ("ODBC") specification which is a standard database access method allowing access to data from various applications.

"Java" is an industry-standard programming language. "Java Database Connectivity," or "JDBC," is an API that allows access from the Java programming language to tabular data sources. JDBC provides cross-database management system connectivity to a wide range of SQL databases and tabular data sources such as spreadsheets and flat files.

Whereas Intelligent Miner's documentation uses the phrases clustering and cluster, the phrases segmentation and segment are also used in the literature and in practice. In this disclosure, we use 'segmentation' and 'segment' synonymously with 'clustering' and 'cluster' respectively.

"XML" stands for 'eXtensible Markup Language,' a language that support user-defined markup including user-defined elements, tags, and attributes. XML is primarily a data definition language, and as such, it is widely used for data transfer and data transformation. XML's extensibility contrasts with most web-related markup languages, such as HTML, which are not extensible, but which instead use a standard defined set of elements, tags, and attributes. XML's extensibility makes it a good foundation for defining other languages. WML, the Wireless Markup Language, for example, is a markup language based on XML. Modern browsers and other communications clients tend to support markup languages other than HTML, including, for example, XML.

"PMML" stands for 'Predictive Model Markup Language' and defines XML representations of data mining results for various data mining algorithms. Data mining tools, including Intelligent Miner, provide a facility to export data mining results in PMML format.

Detailed Description

In this disclosure, we present exemplary embodiments of a unified system that provides a unified approach for managing data mining activities. To manage data mining activities four types of data structures are involved, including input data for data mining model training and model scoring, model training results generated when a data mining tool trains a data mining model, model scoring results generated by the application of a trained data mining model to input data, and metadata for managing data mining models and model training results. The unified system described in exemplary embodiments below is a unified relational database model that represents all four types of data structures.

For convenience in describing typical embodiments of the present invention, we generally refer to IBM's Intelligent Miner as the data mining tool, although persons skilled in the art will realize that any general-purpose data mining tool providing standard data mining functionality is useful to carry out the pertinent steps for the exemplary embodiments of the present invention.

Embodiments of the present invention typically provide related tables including three metadata tables, at least one model training results table wherein model training results data is represented relationally, and a managed representation table for scoring results wherein records from multiple tables containing model scoring results are stored. Exemplary embodiments typically provide as one of the metadata tables a model scoring results control table in which model scoring results tables are registered. Such a scoring results control table in typical embodiments provides metadata useful for selecting model scoring results tables, the selected tables being read such that records from the selected tables are stored in the managed representation table for scoring results. In typical embodiments, at least one model training results table includes a relational table for each hierarchical node embodied in a hierarchical representation of model training results data in a model training results file.

In some exemplary embodiments of the present invention, these tables are classified into a 'published group' and an 'internal group.' The published group in such embodiments is directly accessible by end-users. The published group in such embodiments typically includes the model training results tables and the managed representation table for scoring results. Reporting applications access data from tables in the published group which are designed for easy extraction and application. The three metadata tables are part of the internal group in such embodiments and are used for controlling the mining environment.

Turning now to FIG. 1, an embodiment of the present invention is seen to provide a method for managing data mining activities in a data mining environment (100) having a data mining tool, data sets (102), and a data mining model (104). A typical data mining tool trains a data mining model using an input data set to create model training results and store the model training results in model training results files. Then, using the model training results, the data mining tool scores scoring input data sets to produce scoring output data and store the scoring output data in records in model scoring results tables.

Embodiments of the kind shown in FIG. 1 typically include selecting (110) a model scoring results table (112), wherein the selecting is carried out in dependence upon metadata (114) included in a model scoring results control table (116), the model scoring results control table being related to a data set control table (118) that includes data set metadata (120). Such embodiments also typically include reading (122) a scoring output data record (124) from the selected model scoring results table and storing (126) the scoring output data record in a managed representation table for scoring results (128).

Such embodiments also typically include selecting (130) a model training results file (132), wherein the selecting is carried out in dependence upon metadata (134) included in a mining model control table (136), the mining model control table being related to the data set control table (118) and the model scoring results table (108).

Such embodiments typically include reading (138) training results data (140) from the selected model training results file, and storing (142) the training results data in at least one model training results table (144), the at least one model training results table comprising a relational representation (146) of the training results data from the selected model training results file, while the training results data was in a hierarchical representation (148) in the selected model training results file (132). In such embodiments, reading (138) includes transforming from hierarchical to relational representation and transforming includes parsing and extracting the training results data so read for subsequent storage (142) in a relational representation (146) in the model training results table (144), the transformation being discussed in more detail below.

Turning now to FIG. 2, a further embodiment of the present invention is illustrated by use of a data structure for a data set control table (200), in which the data structure comprises an identification number for each data set (202), a name for each data set (204), a description for each data set (206), a tape for each data set (208), a usage for each data set (210), and a location for each data set (212). In some embodiments of the kind illustrated in FIG. 2, the data set name (204) has a value chosen as the name of a table if the data set is a database table, the name of a view if the data set is a database view, and the name of a file if the data set is a file. In some embodiments of the kind illustrated in FIG. 2, the data set type (208) has the value "0" if the data set type is a database table, the value "1" if the data set type is a database view, and the value "2" if the data set type is a file.

In some embodiments of the kind illustrated in FIG. 2, the data set usage (210) has the value "0" if the data set usage is for input, the value "1" if the data set usage is for output, and the value "2" if the data set usage is for both input and output. In some embodiments of the kind illustrated in FIG. 2, the data set location (212) has a value chosen as a database name if the data set is from a database, and as a full file path if the data set is in a file that is not within a database.

The following DDL script is an example of a script useful within various embodiments of the present invention to create a data set control table named "DATATABS" based upon the data set control table (106) described above and illustrated in FIG. 2.

```
create table DATATABS (
    data_id            integer not null,
    data_name          varchar(32) not null,
    data_desc          varchar(254),
    data_type          integer,
    usage_type         integer,
    data_location      varchar(254) not null,
    primary key (data_id)
);
```

It is a benefit of embodiments of the present invention that establishment and use of a data set control table (118) provides the identifications of data sets (102) stored in a readily accessed single location, along with other information specifically related to each of the data sets, such as the identification number (202), name (204), description (206) and location (212) of all data sets used by the data mining tool in scorings and model trainings. The data mining tool operator, by listing all applicable data sets and registering them in the data set control table, is thus provided with a metadata table with a complete description of such data sets, and has a management system for the same, even when the data sets are located in multiple locations, and when they are generated from multiple applications of different data mining models on different input data sets and from multiple trainings of different data mining models using different training input data. Furthermore, the data set control table is readily updatable to include new data sets. This updating activity is more readily managed and implemented using the data set control table.

Turning now to FIG. 3, a still further embodiment of the present invention is shown wherein a mining model control table is implement by data structure (300), the data structure comprising an identification number for the data mining model (302), a model name for the data mining model (304), a description for the data mining model (306), a model type for the data mining model (308), an algorithm used for training the data mining model (310), an identification number for a model training input data set used by the data mining tool to train the data mining model (312), a date the data mining model was last trained (314), an identification number for a model training results file for the data mining model (316), a file name for the model training results file for the data mining model (318), and a file location for the model training results data set for the data mining model (320).

The following DDL script is an example of a script useful within exemplary embodiments of the present invention to create a mining model control table named "MODELTABS" based upon the mining model control table (reference 136 on FIG. 1) described above and using the data structure illustrated in FIG. 3.

```
create table MODELTABS (
    model_id                integer not null,
    model_name              varchar(32) not null,
    model_desc              varchar(254),
    model_type              integer,
    model_alg               integer,
    train_input_data_id     integer not null,
    date_id                 integer,
    train_result_file id    integer not null,
    train_result_file_name  varchar(32),
    file_location           varchar(254),
    primary key (model_id),
    constraint f_modeltab1 foreign key(train_input_data_id)
        references DATATABS(data_id) on delete restrict,
    constraint f_modeltab2 foreign key(train_result_file_id)
        references DATATABS(data_id) on delete restrict
);
```

Use of the mining model control table (136) provides the benefits of storing the identifications of all data mining models (104) in a readily accessed single location, along with other information specifically related to each of the data mining models, such as the identification number (302), name (304), description (306), type (308) and related algorithms (310) of all data mining models used by the data mining tool in scorings. The data mining tool operator, by listing all applicable data mining models and registering them in the mining model control table, is thus provided with a metadata table with a complete description of such data mining models, and has a management system for the same, even when the data mining models are located in multiple locations. Furthermore, the mining model control table is readily updatable to include new data mining models. The updating activity is more readily managed and implemented using the mining model control table.

Turning now to FIG. 4, a still further embodiment of the present invention is shown wherein the data structure of a typical scoring results control table (108) is illustrated by data structure (400) as comprising an identification number for a model scoring results table (402), an identification number for the data mining model used for scoring (404), an identification number for a scoring input data set for the model scoring results table (406), a name for the model scoring results table (408), a name for a scoring setting (410), and a scoring status indicating whether the model scoring results table is actively used (412). In some embodiments of the kind illustrated in FIG. 4, the scoring status (410) has the value "0" if the scoring status is inactive and the value "1" if the scoring status is active. As indicated in FIG. 4, the scoring setting (410) is the name of the setting used for executing a scoring operation.

The following DDL script is an example of a script useful within exemplary embodiments of the present invention to create a scoring results control table named "APPTABS" based upon the scoring results control table (116) described above and illustrated in FIG. 4.

```
create table APPTABS (
    scoring_results_table_id     integer not null,
    model_id                     integer not null,
    scoring_input_data_id        integer not null,
    scoring_results_table_name   varchar(32),
    scoring_setting_name         varchar(32),
    scoring_status               integer,
    primary key (scoring_results_table_id, model_id,
        scoring_input_data_id),
    constraint f_apptab1 foreign key(scoring_results_table_id)
        references DATATABS(data_id) on delete restrict,
    constraint f_apptab2 foreign key(scoring_input_data_id)
        references DATATABS(data_id) on delete restrict,
    constraint f_apptab3 foreign key(model_id)
        references MODELTABS(model_id) on delete restrict
);
```

Use of the scoring results control table (116) provides the benefits of registereing and storing the identifications (402) of all scoring results tables in a readily accessed single location, along with other information specifically related to each of the individual scoring results output data sets, such as the identification (404) of the data mining models utilized for the scoring, and the identification (406) of the input data used in the scoring. The data mining tool operator is thus provided with a metadata table with a complete description of such scoring results tables, and has a management system for the same, even when the scoring results tables are generated from multiple applications of different data mining models on different input data sets. Furthermore, the scoring results control table is readily updatable to include new information such as new scoring settings. The updating activity is more readily managed and implemented using the scoring results control table.

Turning now to FIG. 5, a still further embodiment of the present invention is shown wherein a managed representation table for scoring results (reference 128 on FIG. 1) is implemented by data structure (500). The data structure comprises an identification number for each record in each selected model scoring results table (502), an identification number for each data mining model used for scoring (504), an identification number for each scoring input data set (506), an identification number for each model scoring results table (508), and model scoring results data from each selected model scoring results table.

In some embodiments of the kind illustrated in FIG. 5, each model scoring results table (reference 112 on FIG. 1) further comprises a record identification number column in which is stored an identification number for each record (reference 124 on FIG. 1) in the model scoring results table, and the managed representation table for scoring results further comprises a record identification column in which an identification number (502) for each record from each selected model scoring results table is stored. The identification numbers stored in the management representation table record identification column are the record identification numbers stored in the model scoring results table record identification column for all the selected model scoring results tables.

In some embodiments of the kind illustrated in FIG. 5, each of the model scoring results tables has a primary key, the primary key comprising the record identification number column in the model scoring results table. A data type of "integer" is shown in FIG. 5 for the record identification column. In situations in which the model scoring results table primary key has a different data type, such as "bigint" or "varchar," further embodiments of the managed representation table for scoring results will have corresponding data types for the record identification column. Similarly, if the model scoring results table has a primary key consisting of more than one column, further embodiments of the managed representation table for scoring results will have additional columns to correspond with the additional primary key columns.

Any company's marketing department spends much of its effort identifying market segments. Segments are groups of shoppers with enough similarities that they qualify for the same marketing campaign. The traditional and most often used method to identify market segments is by constraining various attributes of shoppers (for example, age, sex, income, or geography). Such segments can be identified using reporting and query or OLAP tools (tools for On-Line Analytical Processing) once the constraints that define the segments are chosen.

The data mining technique of clustering, on the other hand, allows the dynamic discovery of segments of shoppers with similar characteristics without having to specify any constraints on the attributes. Intelligent Miner does clustering by searching the records for characteristics that most frequently occur in common, and then grouping the related records into clusters. A marketing manager can inspect these clusters and select some of them as market segments. Thus, clustering makes it possible to identify market segments that might not have been discovered using more traditional methods.

Turning again to FIG. 5, an embodiment is illustrated wherein the data mining model is a clustering model and the data mining tool scores scoring input data sets using the clustering model to produce scoring output data records. When the data mining tool scores the input data sets it establishes clusters and selects from the clusters a best fitting cluster and a second best fitting cluster and scores the fitting quality of each record to the best fitting cluster and the second best fitting cluster. The data mining tool also establishes a confidence value of the cluster assignment of each record. In such embodiments the managed representation table for scoring results further comprises for each record a numerical index for the best fitting cluster (510), the score of the fitting quality of the record to the best fitting cluster (512), a numerical index for the second best fitting cluster (514), the score of the fitting quality of the record to the second best filling cluster (516), and the confidence of the cluster assignment of the record (518).

In typical embodiments of the kind illustrated in FIG. 5, the managed representation table mining model foreign key (reference 164 on FIG. 1) comprises a model identification column (504) in the managed representation table for scoring results in which is stored content from a model identification column in the mining model control table. The managed representation table for scoring results relates to the mining model control table through the managed representation table mining model foreign key.

The following DDL script is an example of a script useful within exemplary embodiments of the present invention to create a managed representation table for scoring results named "APPSCORE" based upon the managed representation table for scoring results (reference 128 on FIG. 1) described above and using the data structure illustrated in FIG. 5.

```
create table APPSCORE (
        record_id                       integer not null,
        model_id                        integer not null,
        scoring_input_data_id           integer not null,
        cluster_id                      integer,
        score                           double,
        cluster2_id                     integer,
        score2                          double,
        confidence                      double,
        primary key (record_id, model_id, scoring_input_data_id), constraint
        f_appscore1 foreign key(model_id)
                references MODELTABS(model_id) on delete restrict,
        constraint f_appscore2 foreign key(scoring_input_data_id)
                references DATATABS(data_id) on delete restrict,
        constraint f_appscore3 foreign key(model_id)
                references CLUSTERING(clustering_id) on delete restrict
        constraint f_appscore4 foreign key(model_id, scoring_input_data_id,
        scoring_results_table_id)
                references APPTABS(model_id, scoring_input_data_id,
                scoring_results_table_id) on delete restrict
);
```

In the foregoing exemplary embodiment, selected model scoring results tables are selected based on metadata in the model scoring results control table named "APPTABS". The selected model scoring results tables are read and the data obtained by reading such tables is stored in the managed representation table for scoring results named "APPSCORE". The following example program logic in the form of a few lines of pseudocode is provided to illustrate enabling the selecting, reading and storing necessary to populate the managed representation table for scoring results with the desired model scoring results data.

```
Select APPTABS.model_id as m_model_id,
       APPTABS.scoring_input_data_id
       as m_scoring_input_data_id
       APPTABS.scoring_results_table_id
       as m_scoring_results_table_id
       from APPTABS table where scoring_status='1';
       For each m_scoring_results_table_id in the above selected list
       {
               Delete from APPSCORE where
                       APPSCORE.model_id='m_model_id' and
                       APPSCORE.scoring_input_data_id=
                               'm_scoring_input_data_id';
               Insert into APPSCORE values (record_id
                                            model_id,
                                            scoring_input_data_id,
                                            cluster_id,
                                            score,
                                            cluster2_id,
                                            score2,
                                            confidence)
               Select
                       key1,
                       'm_model_id',
                       'm_scoring_input_data_id',
                       integer(cluster_index),
                       score,
                       integer(cluster2_index),
                       score2,
                       confidence
                       From
                               m_scoring_results_table_id
       } End for
```

In the example pseudocode, "key1" is the column name of the primary key in a typical model scoring results table. The terms "cluster_index" and "score" are the column names in the model scoring results table for saving the cluster index and its corresponding score for the best fitting cluster. Similarly, the terms "cluster2_index" and "score2" are the column names in the model scoring results table for saving the cluster index and its corresponding score for the second best fitting cluster. The term "confidence" is the column name in the model scoring results table for saving the confidence value for cluster assignment.

The example pseudocode includes the selection from "m_scoring_results_table_id" which is part of the result set of the previous selection from the scoring results control table. This requires dynamic composition of the SQL statement which can be done using various programming languages and database-oriented interfaces as will occur to those of skill in the art including, for example, Java with JDBC or C++ with DB2 CLI.

Use of a managed representation table for scoring results (reference 128 on FIG. 1), in various embodiments of the present invention, provides the benefits of storing the actual data from multiple model scoring results tables in a single table. In such embodiments, after selecting the model scoring results tables of interest from the model scoring results control table (116), the data mining tool operator typically is provided with this single managed representation table for scoring results and can use reporting tools to query the included scoring results with respect to individual records read from the selected model scoring results tables and stored within columns in the managed representation table for scoring results. In addition to the scoring results data, the managed representation table for scoring results provides information related to the data. In typical embodiments such related information includes the identification number (reference 502 on FIG. 5) for each model scoring results table record stored in the managed representation table for scoring results, the identification number (504) of the data mining model associated with the record, and the identification number (506) of the scoring input data set associated with the record.

Figure 6:
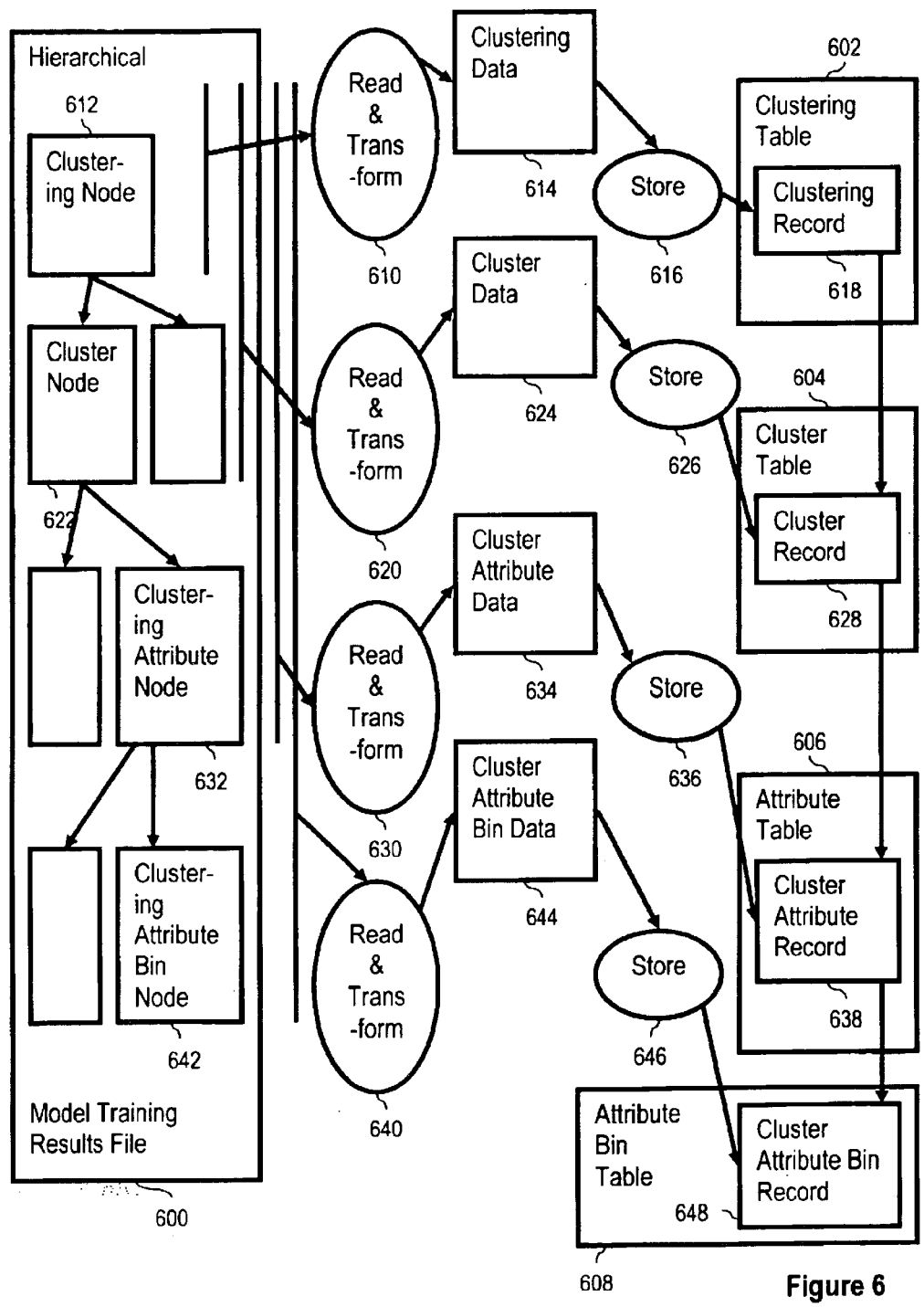
FIG. 6 is a process flow diagram illustrating a training results data conversion aspect of a typical example embodiment of the present invention.

Turning now to FIG. 6, a further embodiment is shown wherein the data mining model is a clustering model, the model training results file (600) comprises a hierarchical representation of model training results, and the at least one model training results table comprises a clustering table (602), a cluster table (604), a cluster attribute table (606) and a cluster attribute bin table (608). In such embodiments, the reading of the training results data from the selected model training results file in a model training results table further comprises reading (610), from a hierarchical clustering node (612) embodied in the hierarchical representation of model training results, clustering data describing a clustering, and storing (616) the clustering data in a relational clustering record (618) in the clustering table (602). In typical embodiments, the relational clustering record includes a clustering identification field (reference 702 on FIG. 7) and the model training results table foreign key (reference 168 on FIG. 1) comprises the clustering identification field in the clustering record in which is stored content from a model identification field (reference 154 on FIG. 1) in the mining model control table (reference 136 on FIG. 1). The clustering table relates to the mining model control table through the model training results table foreign key (reference 168 on FIG. 1), and the managed representation table training result foreign key (reference 170 on FIG. 1) references the clustering identification field, thus relating the managed representation table for scoring results (reference 128 in FIG. 1) to both the clustering table clustering identification field and to the mining model control table model identification field.

The example embodiment in FIG. 6, includes reading (620), from a hierarchical cluster node (622) embodied in the hierarchical representation of model training results, cluster data (624) describing a cluster, and storing (626) the cluster data in a relational cluster record (628) in the cluster table (604). In typical embodiments of the kind illustrated, the hierarchical cluster node is embodied, in a position in the hierarchy below the hierarchical clustering node. In typical embodiments, the relational cluster record is related to the relational clusteringrecord through a foreign key comprising the clustering identification field (as illustrated for example at reference 804 on FIG. 8), and the relational cluster record includes a cluster identification field (reference 802 on FIG. 8).

The example embodiment illustrated in FIG. 6 includes reading (630), from a hierarchical cluster attribute node (632) embodied in the hierarchical representation of model training results, cluster attribute data (634) describing a cluster attribute, and storing (636) the cluster attribute data in a relational cluster attribute record (638) in the cluster attribute table (606). In typical embodiments of the kind illustrated, the hierarchical cluster attribute node is embodied in a position in the hierarchy below the hierarchical cluster node. In typical embodiments of the kind illustrated, the relational cluster attribute record is related to the relational cluster record (800) through a foreign key comprising the cluster identification field (reference 906 on FIG. 9). In typical embodiments of the kind illustrated, the relational cluster attribute record is related to the relational clustering record (700) through a foreign key comprising the clustering identification field (reference 904 on FIG. 9). In typical embodiments of the kind illustrated the relational cluster attribute record includes a cluster attribute identification field.

The example embodiment illustrated in FIG. 6, includes reading (640), from a hierarchical cluster attribute bin node (642) embodied in the hierarchical representation of model training results, cluster attribute bin data (644) describing a cluster attribute bin, and storing (646) the cluster attribute bin data in a relational cluster attribute bin record (648) in the cluster attribute bin table (608). In typical embodiments of the kind illustrated in FIG. 6, the hierarchical cluster attribute bin node is embodied in a position in the hierarchy below the hierarchical cluster attribute node, and the relational cluster attribute bin record (1000) is related to the relational cluster attribute record through a foreign key comprising the cluster attribute identification field (reference 1008 on FIG. 10). In typical embodiments of the kind shown in FIG. 6, the relational cluster attribute bin record (1000) is related to the relational cluster record through a foreign key comprising the cluster identification field (reference 1006 on FIG. 10), and in such typical embodiments, the relational cluster attribute bin record is related to the relational clustering record (700) through a foreign key comprising the clustering identification field (reference 1004 on FIG. 10). In typical embodiments of the kind illustrated, the relational cluster attribute bin record includes a cluster attribute bin identification field (reference 1002 on FIG. 10).

In the foregoing exemplary embodiment, selected model training results files are selected based on metadata in the mining model control table named "MODELTABS". The selected model training results files are read and the training results data obtained by reading such files is stored in a relational format in model training results tables. The following program logic in the form of a few lines of pseudocode is provided to illustrate selecting, reading and storing as needed to populate a managed representation table for scoring results with desired model scoring results data.

```
Select model_id as m_model_id,
       model_name as m_model_name,
       model_desc as m_model_desc,
       train_result_file_name as m_train_result_file_name,
       file_location as m_file_location
from MODELTABS
For each m_model_id in the above selection result set
{
    Extract information of m_model_id, m_model_name and
    m_model_desc
        And populate the general information in CLUSTERING
        table for this model with the
        clustering_id=m_model_id;
    Read model training result from m_train_result_file_name at
    m_file_location
    Parse result file using XML file parser
    Populate the CLUSTERING table
    Extract information about clusters and populate CLUSTER
    table
    Extract information about the cluster attribute and populate the
    CLUSTER_ATTRIBUTE table,
    Extract detail statistical information about each cluster attribute
    bin
    and populate the CLUSTER_ATTRIBUTE_BIN tables
} End for
```

The implementation of the program logic requires reading the model training results file which is in an XML format, the reading including transforming the training result. The transforming includes parsing the XML file and extracting training results data from the XML file, and after the transforming, storing the data in relational database tables. This can be done using various programming languages and database-oriented interfaces as will occur to those of skill in the art including, for example, Java with JDBC or C++ with DB2 CLI. An XML parser such as IBM's XML4J can be used for parsing the XML file. More detailed descriptions of exemplary clustering, cluster, cluster attribute, and cluster attribute bin tables are set forth below in this disclosure.

Turning now to FIG. 7, a further embodiment of a relational clustering record (700) is shown in which the clustering data as recorded in the relational clustering record comprises a unique identifier for the relational clustering record (702), a text name for the clustering (704), a text description of the purpose of a clustering represented by the relational clustering record (706), a clustering type (708), a number of clusters given by the clustering (710), a number of attributes considered in the clustering (712), an algorithm field identifying the clustering algorithm used in the clustering (714), and an items numeric field that stores the number of data items input to the clustering from the operational data (716). In some embodiments, the clustering type (708) has the value "demographic." In some embodiments, the clustering type (708) has the value "neural."

The following DDL code is an example of a script useful within the present invention to create a relational clustering record (700) based upon the relational data format described above and illustrated in FIG. 7.

```
create table CLUSTERING (
        clustering_id           integer not null,
        clustering_name         varchar(64),
        clustering_desc         varchar(254),
        clustering_type         integer,
        num_clusters            integer,
        num_attributes          integer,
        clustering_alg          integer,
        num_items               integer,
        primary key (clustering_id),
        constraint f_clustering1 foreign key(clustering_id)
                references MODELTABS(model_id) on delete restrict
);
```

Turning now to FIG. 8, a more detailed embodiment of a relational cluster record (800) is shown wherein the cluster data as recorded in the relational cluster record includes a unique identifier for the cluster (802), a unique identifier of a relational clustering record to which the relational cluster record related (804), an ordinal number of the relational cluster record (806), a text name for the cluster represented by the relational cluster record (808), a text description of the purpose of the cluster represented by the relational cluster record (810), and a numeric field identifying the number of data items from the operational data that are represented in records related to the relational cluster record (812).

The following DDL code is an example of a script useful within the present invention to create a relational cluster record (800) based upon the relational data format described above and illustrated in FIG. 8.

```
create table CLUSTER (
        cluster_id              integer not null,
        clustering_id           integer not null,
        cluster_index           integer,
        cluster_name            varchar(64),
        cluster_desc            varchar(254),
        num_items               integer,
        primary key (clustering_id, cluster_id)
);
```

Turning now to FIG. 9, a more detailed example embodiment of a relational cluster attribute record (900) is seen wherein the cluster attribute data as recorded in the relational cluster attribute record includes a unique identifier of the relational cluster attribute record (902), a unique identifier of a relational clustering record to which the relational cluster attribute record is related (904), a unique identifier of a relational cluster record to which the relational cluster attribute record is related (906), an attribute type (908), a text name of a relational cluster attribute represented by the relational cluster attribute record (910), a text description of the relational cluster attribute (912), a use type field (914), a categories numeric field indicating a number of categories associated with the cluster attribute when the attribute type has the value "categorical" (916), a lowest value numeric field indicating a lowest value allowed when the attribute type has the value "continuous" (918), a highest value numeric field indicating a highest value allowed when the attribute type has the value "continuous" (920), and an items numeric field identifying the number of data items from the scoring input data set that are represented in records related to the relational cluster attribute record (922).

In some embodiments of the kind illustrated in FIG. 9, the use type field has the value "active." In some embodiments of the kind illustrated in FIG. 4, the use type field has the value "supplementary." In some embodiments of the kind illustrated in FIG. 9, the attribute type has the value "categorical." In some embodiments of the kind illustrated in FIG. 9, the attribute type has the value "continuous."

The following DDL code is an example of a script useful within the present invention to create a relational cluster attribute record (900) based upon the relational data format described above and illustrated in FIG. 9.

```
create table ATTRIBUTE (
        attribute_id            integer not null,
        clustering_id           integer not null,
        cluster_id              integer not null,
        attribute_type          integer,
        attribute_name          varchar(32) not null,
        attribute_desc          varchar(254),
        active_sup_type         integer,
        num_categories          integer,
        from_range              double,
        to_range                double,
        num_items               integer,
        primary key (clustering_id, cluster_id, attribute_id)
);
```

Turning now to FIG. 10, a further embodiment of a relational cluster attribute bin record (1000) is shown wherein the cluster attribute bin data as recorded in the relational cluster attribute bin record includes a unique identifier of the attribute bin (1002), a unique identifier of a relational clustering record to which the relational attribute bin record is related (1004), a unique identifier of a relational cluster record to which the relational attribute bin record is related (1006), a unique identifier of a relational attribute record to which the relational attribute bin record is related (1008), a text name for the attribute bin represented by the relational attribute bin record (1010), a category name (1012), a lowest value numeric field in which is stored the lowest value in the bin (1014), a highest value numeric record in which is stored the highest value in the bin (1016), an items numeric field in which is stored the number of items in the bin (1018), a values sum numeric field in which is stored the sum of the values in the bin (1020), and a squares numeric field in which is stored the sum of the squares of values in the bin (1022).

The following DDL code is an example of a script useful within the present invention to create a relational cluster attribute bin record (1000) based upon the relational data format described above and illustrated in FIG. 10.

```
create table ATTRIBUTE_BIN (
    bin_id              integer not null,
    clustering_id       integer not null,
    cluster_id          integer not null,
    attribute_id        integer not null,
    bin_name            varchar(64),
    category_name       varchar(64),
    from_range          double,
    to_range            double,
    num_items           integer,
    value_sum           double,
    value_sqr_sum       double,
    primary key (clustering_id, cluster_id, attribute_id, bin_id)
);
```

Returning to the exemplary embodiment of FIG. 1, a relationship of the data set control table (118) to the mining model control table (136) is seen in which a mining model control table foreign key (152) comprises the model training input data set identification column (reference 312 on FIG. 3) in the mining model control table, in which is stored content from the data set identification column (150) of the data set control table. The referencing mining model control table of the illustrated example embodiment relates to the referenced data set control table through the foreign key. The identification number for the model training input data set is stored in the data set identification column (reference 202 on FIG. 2) of the data set control table and also in the model training input data set identification column of the mining model control table.

Again with respect to the exemplary embodiment of FIG. 1, a relationship of the data set control table (118) to the mining model control table (136) is shown in which the mining model control table foreign key (152) comprises the model training results file identification column (reference 316 on FIG. 3) in the mining model control table, in which is stored content from the data set identification column (150) of the data set control table. The referencing mining model control table of the illustrated embodiment relates to the referenced data set control table through the foreign key. The identification number for the model training results data set in such embodiments is stored in the data set identification column (reference 202 on FIG. 2) of the data set control table and also in the model training results data set identification column of the mining model control table.

Also in an exemplary embodiment according to FIG. 1, a relationship of the data set control table (118) to the scoring results control table (116) is shown in which the scoring results control table data set foreign key (158) comprises the scoring results table identification column (reference 402 on FIG. 4) in the scoring results control table in which is stored content from the data set identification column (150) of the data set control table. The referencing scoring results control table in the illustrated embodiment relates to the referenced data set control table through the foreign key. The identification number for the scoring results table identification number in such embodiment typically is stored in the data set identification column (reference 202 on FIG. 2) of the data set control table and also in the scoring results table identification column of the scoring results control table.

Further with reference to an exemplary embodiment according to FIG. 1, a relationship of the data set control table (118) to the scoring results control table (116) is shown in which the scoring results control table data set foreign key (158) comprises the scoring input data set identification column (reference 406 on FIG. 4) in the scoring results control table in which is stored content from the data set identification column (150) of the data set control table (118). The referencing scoring control table of the illustrated embodiment relates to the referenced data set control table through the foreign key. The identification number for the scoring input data set identification number in typical embodiments of this kind is stored in the data set identification column (reference 202 on FIG. 2) of the data set control table and also in the scoring input data set identification column of the scoring results control table.

Again in the exemplary embodiment of FIG. 1, a relationship of the mining model control table (136) to the scoring results control table (116) is shown in which the scoring results control table mining model foreign key (156) comprises the model identification column (reference 404 on FIG. 4) in the scoring control table in which is stored content from the model identification column (150) of the mining model control table. The referencing scoring results control table of the illustrated embodiment relates to the referenced mining control table through the foreign key. The identification number for the model is stored in the model identification column (reference 302 on FIG. 3) of the mining model control table and also in the mining model identification column of the scoring results control table.

Further with reference to an exemplary embodiment according to FIG. 1, a relationship of the data set control table (118) to the managed representation table for scoring results (128) is shown in which the managed representation table data set foreign key (162) comprises the model scoring input data set identification column (reference 506 on FIG. 5) in the managed representation table for scoring results in which is stored content from the data set identification column (150) of the data set control table. The referencing managed representation table for scoring results of the illustrated embodiment relates to the referenced data set control table through the foreign key. The identification number for the scoring input data set is stored in the data set identification column (reference 202 on FIG. 2) of the data set control table and also in the scoring input data set identification column of the managed representation table for scoring results.

Further with reference to an exemplary embodiment according to FIG. 1, a relationship of the mining model control table (136) to the managed representation table for scoring results (128) is shown in which the managed representation table mining model foreign key (164) comprises the model identification column (reference 504 on FIG. 5) in the managed representation table for scoring results in which is stored content from the model identification column (154) of the mining model control table. The referencing managed representation table for scoring results of the illustrated embodiment relates to the referenced mining model control table through the foreign key. The model identification number is stored in the model identification column (reference 302 on FIG. 3) of the mining model control table and also in the model identification column of the managed representation table for scoring results.

Further with reference to an exemplary embodiment according to FIG. 1, a relationship of the scoring results control table (116) to the managed representation table for scoring results (128) is shown in which the managed representation table model scoring results foreign key (166) comprises a scoring input data set identification column (reference 506 in FIG. 5) in the managed representation table for scoring results in which is stored content from a scoring input data set identification column (160) of the model scoring results control table (reference 406 on FIG. 4) and a model identification column (reference 504 on FIG. 5) in the managed representation table for scoring results in which is stored content from a model identification column (reference 404 on FIG. 4) of the model scoring results control table. The managed representation table model scoring results foreign key (166) of the illustrated embodiment further comprises a model scoring results table identification column (reference 508 on FIG. 5) in the managed representation table for scoring results in which is stored content from a model scoring results table identification column (reference 402 on FIG. 4) of the model scoring results control table. The referencing managed representation table for scoring results relates to the referenced model scoring results control table through the managed representation table model scoring results foreign key (166).

Further with reference to an exemplary embodiment according to FIG. 1, a relationship of the mining model control table (136) to the at least one model training result table (144) is shown in which the model training results table foreign key (168) comprises the model identification column in one of the at least one model training results table in which is stored content from the model identification column (154) of the mining model control table. The referencing model training results table of the illustrated embodiment relates to the referenced mining model control table through the foreign key. The model identification number is stored in the model identification column (reference 302 on FIG. 3) of the mining model control table and also in the model identification column of the referencing model training results table. When the mining model is a clustering model, as described above, the model identification column becomes the clustering identification column in the clustering table (reference 702 on FIG. 7).

Further with reference to an exemplary embodiment according to FIG. 1, a relationship of the at least one model training results table (144) to the managed representation table for scoring results (128) is shown in which the managed representation table training results foreign key (170) comprises the model identification column (reference 504 on FIG. 5) in the managed representation table for scoring results in which is stored content from the model identification column (168) of one of the at least model training results table. The referencing managed representation table for scoring results of the illustrated embodiment relates to the referenced model training results table through the foreign key. The model identification number is stored in the model identification column of the model training results table and also in the model identification column of the managed representation table for scoring results. When the mining model is a clustering model, the model identification column in the model training result table becomes the clustering identification column in the clustering table.

Returning to FIG. 3, in a further exemplary embodiment of the mining model control table (reference 136 on FIG. 1), the model training results file (316) is in an XML language known as "PMML," for Predictive Modeling Markup Language. In the example, the model training results file also appears in the PMML format in the data set control table (118) as one of the data sets.

FIGS. 11–15 show the details of an exemplary embodiment of the present invention, an example of a unified system in which a data mining tool utilizes two different data mining models in two different scorings. The example uses the following "Demographic Clustering Model A" (hereinafter "Model A") and "Demographic Clustering Model B" (hereinafter "Model B").

Demographic Clustering Model A:

| | |
|---|---|
| Data mining model name: | wcainitchar12 |
| Model training input data set for data mining model training: | wcamng.initchar |
| Training results file for the data mining model (in PMML format): | wcainitchar12.xml |
| The scoring setting name for the scoring operation: | wcainitchar12a |
| Scoring input data set used as input for model scoring: | wcamng.initchar |
| Scoring results table for model scoring: | wcamng.initapp12 |

Demographic Clustering Model B:

| | |
|---|---|
| Data mining model name: | wcamembchar22 |
| Model training input data set for data mining model training: | wcamng.membsumsamp |
| Training results file for the data mining model (in PMML format): | wcamembchar22.xml |
| The scoring setting name for the scoring operation: | wcamembar22a |
| Scoring input data set used as input for model scoring: | wcamng.membsums |
| Scoring results table for model scoring: | wcamng.memapp22 |

With reference to Model A, and as illustrated in FIG. 12, the data mining model has the name (304) of "wcainitchar12" and the model identification number (302) of "1,101." The data mining model is defined by the data mining tool and trained with input data having the name of "wcamng.initchar" and an identification number (312) of "1,001." The trained data mining model is exported in PMML format in a file having the name (318) of "wcainitchar12.xml" with an identification number (316) of "1,002." For Model A, the data mining model scores, i.e. is applied to, the same input data as was used in training the data mining model. This input data set is assigned the same identification number of "1,001," as shown in FIG. 12 and FIG. 13. The scoring results output data set is saved in a database table with the name (408) of "wcamng.initapp12" and with an identification number (402) of "1,003," as indicated in FIG. 13. The scoring setting executing the scoring operation has the name (410) of "wcainitcahr12a." In some embodiments the data mining model name (304) will be included in the scoring setting name.

With reference to Model B, and as illustrated in FIG. 12, the data mining model has the name (304) "wcamembchar22" and the model identification number (302) of "1,201." The data mining model is defined by the data mining tool and trained with an input data set that is a data sampling having the name of "wcamng.memsumbsamp" and an identification number (312) of "2,002." As shown in FIG. 12, the trained data mining model is exported in PMML format in a file having the name (318) of "wcamembchar22.xml" with an identification number (316) of "2,003." As shown in FIG. 13, the data mining model scores the scoring input data set having an identification number (406) of "2,001" and the name of "wcamng.membsums." The scoring results output data set is saved in a database table with the name (408) of "wcamng.memapp22" and with an identification number (402) of "2,004." The scoring setting executing the scoring operation has the name (410) of "wcamembchar22a," the name including the data mining model name (304), which in this example is "wcamembchar22."

The foregoing example illustrates the thoroughness with which all information related to typical data mining operations is described in the three metadata tables, and the above-described foreign keys are shown in this example to have established referential integrity between selected columns in the tables. As shown in the example, the identification number "1,001" for an input data set has been first stored in the data set identification column of the metadata table referred to herein as the data set control table (reference 202 on FIG. 11). By virtue of one of the previously described mining model control table foreign keys, and one of the previously described scoring control table data set foreign keys, the identification number "1,001" is duplicated appropriately in the training input data identification column (reference 312 in FIG. 12) in the mining model control table (reference 136 on FIG. 1), that is, the second metadata table. It is further duplicated in the scoring input data identification column (reference 406 in FIG. 13) of the scoring results control table (reference 116 on FIG. 1), that is, the third metadata table.

Similarly, by initially storing the identification number "1,003" in the data set identification column (reference 202 in FIG. 11) of the data set control table, embodiments of the metadata system of the present invention provide for a future scoring output data set to be described and identified by this number in a metadata table that describes all data sets of any type and simultaneously described, using the same identification number "1,003," in a metadata table that describes all scoring outputs and scoring output related information.

FIG. 14 illustrates the relational clustering table that resulted from the change from the hierarchically represented training results data in the model training results files "wcainitchar12.xml" and "wcamembchar22.xml" to the relationally represented training results data shown in the clustering table (602). Although not shown, the unified system of the present example also generates the relational cluster, attribute and attribute bin tables as discussed above, thus providing a relational representation of the data so that the data can be accessed very quickly by reporting tools that exploit the fast indexing facilities of relational databases. Such relational tables in the present example have a clustering identification column (for example, reference 804 on FIG. 8).

In the present example, the clustering table is related to the mining model control table through the model training results table foreign key (reference 168 on FIG. 1) which comprises the clustering identification column. The model training results table foreign key in this example references the model identification column (reference 302 on FIG. 3) of the mining model control table, as does the managed representation table mining model foreign key (reference 164 on FIG. 1) which comprises the model identification column (reference 504 on FIG. 5) in the managed representation table for scoring results.

The managed representation table training results foreign key, in this example, references the clustering identification column of the clustering table, the clustering table clustering identification column being referenced by each of the other model training results control tables, thus further unifying the tables. The relationship between the model training results tables and the detailed information on the individual records in the model scoring results in the managed representation table for scoring results is important. The further unification achieved by the addition of the "child-parent" relationship between the managed representation table for scoring results and the clustering table supports the referential integrity of the tabled data.

In this example, the relational tables such as clustering table 602 are used very efficiently for the subsequent model scoring that generated the model scoring results tables "wcamng.initapp11" and "wcamng.memapp22." Once generated these scoring results tables are unmanaged until registered in the models scoring results control table (116) along with related metadata to enable the selection of either or both of the tables for reading. In the example embodiment illustrated in FIG. 15, both model scoring results tables are selected. Records (reference 112 on FIG. 1) are then read (122) from the tables and stored (126) in the managed representation table for scoring results (128).

This example illustrates the advantage of managing multiple model scoring results tables in the managed representation table for scoring results. As shown in FIG. 15, the data mining model identification number related to each record is displayed in the data mining model identification column (504) of the managed representation table for scoring results along with the identification number (506) of the related scoring input data set used in the scoring. This information accompanies the actual scores and other scoring output data included in each record. This assembly of information for each record is readily available for querying by typical reporting tools.

In embodiments of this kind, for example, a query that locates records having a "cluster_id" value of "1" locates the record with the "record_id" of "10,010," as shown in FIG. 15. The managed representation table for scoring results described in this example embodiment shows that this record was generated when the data mining model having the identification number "1,101" was used in scoring the input data with the identification number "1,001." The same query locates the record "9,990," which was generated when a different data mining model having the identification number "1,201" was used in scoring the different input data having the identification number "2,001."

Each record located in such a query is accompanied by the identification numbers of the related data mining model and the related scoring input data set. The managed representation table for scoring results is a unified table by virtue of its relation, as a referencing table, to the clustering model identification fields in both the mining model control table and the model training results tables. This exemplary embodiment illustrates that the use of the managed representation table for scoring results enhances the querying technique in that a single table can be queried that includes the collected records from multiple model scoring results tables generated by scoring multiple input data sets using multiple data mining models.

It will be understood from the foregoing description that various modifications and changes may be made in the exemplary embodiments of the present invention without departing from its true spirit. It is intended that this description is for purposes of illustration only and should not be construed in a limiting sense. The scope of this invention should be limited only by the language of the following claims.

What is claimed is:

1. A method for managing data mining activities in a data mining environment, the data mining environment having data sets, a data mining tool, a data mining model, model training results stored in model training results files, and scoring output data stored in records in model scoring results tables, the method comprising:

selecting a model scoring results table, wherein the selecting is carried out in dependence upon metadata included in a model scoring results control table, the model scoring results control table being related to a data set control table including data set metadata;

reading a scoring output data record from the selected model scoring results table;

storing the scoring output data record in a managed representation table for scoring result, the managed representation table for scoring results comprising an identification number for each record in the selected model scoring results table and model scoring results data from the selected model scoring results table;

selecting a model training results file, wherein the selecting is carried out in dependence upon metadata included in a mining model control table, the mining model control table being related to the data set control table and the model scoring results control table;

reading training results data from the selected model training results file; and storing the training results data in at least one model training results table, the at least one model training results table comprising a relational representation of the training results data from the selected model training results file, one of the at least one model training results table referencing the mining model control table, the managed representation table for scoring results being related to the referencing model training results table, the data set control table, the mining model control table, and the model scoring results control table.

2. The method of claim 1 wherein the data set control table comprises:
an identification number for each data set;
a name for each data set;
a description for each data set;
a type for each data set;
a usage for each data set; and
a location for each data set.

3. The method of claim 1 wherein the mining model control table comprises:
an identification number for the data mining model;
a model name for the data mining model;
a description for the data mining model;
a model type for the data mining model;
an algorithm used for training the data mining model;
an identification number for a model training input data set used by the data mining tool to train the data mining model;
a date the data mining model was last trained;
an identification number for a model training results file for the data mining model;
a file name for the model training results file for the data mining model; and
a file location for the model training results file for the data mining model.

4. The method of claim 1 wherein the model scoring results control table comprises:
an identification number for each model scoring results table;
an identification number for the data mining model used for the model scoring results table;
an identification number for a scoring input data set for the model scoring results table;
a name for the model scoring results table;
a name for a scoring setting; and
a scoring status indicating whether the model scoring results table is actively used.

5. The method of claim 1 wherein the managed representation table for scoring results comprises:
an identification number for each data mining model used for scoring;
an identification number for each scoring input data set; and
an identification number for each model scoring results table.

6. The method of claim 5, wherein the data mining model is a clustering model and the data mining tool scores scoring input data sets using the clustering model to produce scoring output data records, to establish clusters, to select from the clusters a best fitting cluster and a second best fitting cluster, to score the fitting quality of each record to the best fitting cluster, to score the fitting quality of each record to the second best fitting cluster, and to establish a confidence value of the cluster assignment of each record, the managed representation table for scoring results further comprising for each record:
a numerical index for the best fitting cluster;
a score of the fitting quality of the record to the best fitting cluster;
a numerical index for the second best fitting cluster;
a score of the fitting quality of the record to the second best filling cluster; and
a confidence value of the cluster assignment of the record.

7. The method of claim 5, wherein the data mining model is a clustering model and the data mining tool scores scoring input data sets using the clustering model to produce scoring output data records, and wherein the managed representation table further comprises a model identification column in the managed representation table for scoring results in which is stored content from the clustering model identification column in the at least one model training results table, the managed representation table for scoring results relating to the at least one model training result table through the managed representation table model identification column.

8. The method of claim 5, wherein:
each model scoring results table further comprises a record identification number column in which is stored an identification number for each record in the model scoring results table; and
the managed representation table for scoring results further comprises a record identification column in which the identification number for each record from each selected model scoring results table is stored, the identification numbers being those identification numbers stored in the model scoring results table record identification column.

9. The method of claim 1 wherein the selected model training results file comprises a hierarchical representation of the model training results.

10. The method of claim 1 wherein:
the data mining model is a clustering model;
the selected model training results file comprises a hierarchical representation of model training results; and
the at least one model training results table comprises a clustering table, a cluster table, a cluster attribute table and a cluster attribute bin table, and
reading the training results data from the selected model training results file in a model training results table further comprises:

reading, from a hierarchical clustering node embodied in the hierarchical representation of model training results, clustering data describing a clustering, and storing the clustering data in a relational clustering record in the clustering table, wherein f
  the relational clustering record includes a clustering identification field in which is stored content from a model identification field in the mining model control table, the clustering table relating to the mining model control table through the clustering identification field; and
  the managed representation table comprises a model identification field in which is stored content from the clustering identification field in the clustering table and from a model identification field in the mining model control table, the managed representation table for scoring results relating to the clustering table and to the mining model control table through the managed representation table model identification field;

reading, from a hierarchical cluster node embodied in the hierarchical representation of model training results, cluster data describing a cluster, and storing the cluster data in a relational cluster record in the cluster table, wherein
  the hierarchical cluster node is embodied in a position in the hierarchy below the hierarchical clustering node;
  the relational cluster record is related to the relational clustering record through a first foreign key comprising the clustering identification field; and
  the relational cluster record includes a cluster identification field;

reading, from a hierarchical cluster attribute node embodied in the hierarchical representation of model training results, cluster attribute data describing a cluster attribute, and storing the cluster attribute data in a relational cluster attribute record in the cluster attribute table, wherein
  the hierarchical cluster attribute node is embodied in a position in the hierarchy below the hierarchical cluster node;
  the relational cluster attribute record is related to the relational cluster record through a second foreign key comprising the cluster identification field;
  the relational cluster attribute record is related to the relational clustering record through a third foreign key comprising the clustering identification field; and
  the relational cluster attribute record includes a cluster attribute identification field;

reading, from a hierarchical cluster attribute bin node embodied in the hierarchical representation of model training results, cluster attribute bin data describing a cluster attribute bin, and storing the cluster attribute bin data in a relational cluster attribute bin record in the cluster attribute bin table, wherein
  the hierarchical cluster attribute bin node is embodied in a position in the hierarchy below the hierarchical cluster attribute node;
  the relational cluster attribute bin record is related to the relational cluster attribute record through a fourth foreign key comprising the cluster attribute identification field;
  the relational cluster attribute bin record is related to the relational cluster record through a fifth foreign key comprising the cluster identification field; and
  the relational cluster attribute bin record is related to the relational clustering record through a sixth foreign key comprising the clustering identification field.

11. The method of claim 10 wherein the clustering data as recorded in the relational clustering record comprises:
  a unique identifier for the relational clustering record;
  a text name for the relational clustering record;
  a text description of the purpose of a clustering represented by the relational clustering record;
  a clustering type;
  a number of clusters given by the clustering;
  a number of attributes considered in the clustering;
  an algorithm field identifying the clustering algorithm used in the clustering; and
  an items numeric field that stores the number of data items input to the clustering from the scoring input data set.

12. The method of claim 10 wherein the cluster data as recorded in the relational cluster record comprises:
  a unique identifier for the cluster;
  a unique identifier of a relational clustering record to which the relational cluster record related;
  an ordinal number of the relational cluster record;
  a text name for the cluster represented by the relational cluster record;
  a text description of the purpose of the cluster represented by the relational cluster record; and
  a numeric field identifying the number of data items from the scoring input data set that are represented in records related to the relational cluster record.

13. The method of claim 10 wherein the cluster attribute data as recorded in the relational cluster attribute record comprises:
  a unique identifier of the relational cluster attribute record;
  a unique identifier of a relational clustering record to which the relational cluster attribute record is related;
  a unique identifier of a relational cluster record to which the relational cluster attribute record is related;
  an attribute type;
  a text name of a relational cluster attribute represented by the relational cluster attribute record;
  a text description of the relational cluster attribute;
  a use type field;
  a categories numeric field indicating a number of categories associated with the cluster attribute when the attribute type has the value "categorical;"
  a lowest value numeric field indicating a lowest value allowed when the attribute type has the value "continuous;"
  a highest value numeric field indicating a highest value allowed when the attribute type has the value "continuous;"
  an items numeric field identifying the number of data items from the scoring input data set that are represented in records related to the relational cluster attribute record.

14. The method of claim 10 wherein the cluster attribute bin data as recorded in the relational cluster attribute bin record comprises:
  a unique identifier of the attribute bin;
  a unique identifier of a relational clustering record to which the relational attribute bin record is related;

a unique identifier of a relational cluster record to which the relational attribute bin record is related;

a unique identifier of a relational attribute record to which the relational attribute bin record is related;

a text name for the attribute bin represented by the relational attribute bin record;

a category name;

a lowest value numeric field in which is stored the lowest value in the bin;

a highest value numeric record in which is stored the highest value in the bin;

an items numeric field in which is stored the number of items in the bin;

a values sum numeric field in which is stored the sum of the values in the bin; and a squares numeric field in which is stored the sum of the squares of values in the bin.

15. The method of claim 1, wherein:

the mining model control table is related to the data set control table through a mining model control table data set foreign key;

the model scoring results table is related to the data set control table through a model scoring results table data set foreign key and to the mining model control table through a model scoring results table mining model foreign key;

the managed representation table for scoring results is related to the data set control table through a managed representation table data set foreign key, to the mining model control table through a managed representation table mining model foreign key, and to the model scoring results control table through a managed representation table model scoring results foreign key; and the referencing model training results table references the mining model control table through a model training results table foreign key, and the managed representation table for scoring results is related to the referencing model training results table through a managed representation table training results foreign key.

16. The method of claim 15, wherein the mining model control table foreign key comprises a model training input data set identification column in the mining model control table in which is stored content from a data set identification column of the data set control table, the mining model control table relating to the data set control table through the foreign key.

17. The method of claim 15, wherein the mining model control table foreign key comprises a model training results file identification column in the mining model control table in which is stored content from a data set identification column of the data set control table, the mining model control table relating to the data set control table through the foreign key.

18. The method of claim 15, wherein the model scoring results control table data set foreign key comprises a model scoring results table identification column in the model scoring results control table in which is stored content from a data set identification column of the data set control table, the model scoring results control table relating to the data set control table through the foreign key.

19. The method of claim 15, wherein the model scoring results control table data set foreign key comprises a scoring input data set identification column in the model scoring results control table in which is stored content from a data set identification column of the data set control table, the model scoring results control table relating to the data set control table through the foreign key.

20. The method of claim 15, wherein the model scoring results control table mining model foreign key comprises a model identification column in the model scoring results control table in which is stored content from a model identification column of the mining model control table, the model scoring results control table relating to the mining model control table through the foreign key.

21. The method of claim 15, wherein the managed representation table data set foreign key comprises a model scoring input data set identification column in the managed representation table for scoring results in which is stored content from a data set identification column of the data set control table, the managed representation table for scoring results relating to the data set control table through the managed representation table data set foreign key.

22. The method of claim 15, wherein the managed representation table mining model foreign key comprises a model identification column in the managed representation table for scoring results in which is stored content from a model identification column of the mining model control table, the managed representation table for scoring results relating to the mining model control table through the managed representation table mining model foreign key.

23. The method of claim 15, wherein the managed representation table model scoring results foreign key comprises:

a scoring input data set identification column in the managed representation table for scoring results in which is stored content from a scoring input data set identification column of the model scoring results control table, a model identification column in the managed representation table for scoring results in which is stored content from a model identification column of the model scoring results control table, and a model scoring results table identification column in the managed representation table for scoring results in which is stored content from a model scoring results table identification column of the model scoring results control table, the managed representation table for scoring results relating to the model scoring results control table through the managed representation table model scoring results foreign key.

24. The method of claim 15, wherein the model training results table foreign key comprises a model identification column in one of the at least one model training results table in which is stored content from a model identification column of the mining model control table, the model training results table relating to the mining model control table through the model training results table foreign key.

25. The method of claim 15, wherein the managed representation table training results foreign key comprises a model identification column in the managed representation table for scoring results in which is stored content from a model identification column in one of the at least one model training results tables.

26. The method of claim 1, wherein the model training results file is in Predictive Model Markup Language format.

27. A system for managing data mining activities in a data mining environment, the data mining environment having data sets, a data mining tool, a data mining model, model training results stored in model training results files, and scoring output data stored in records in model scoring results tables, the system comprising:

means for selecting a model scoring results table, wherein the means for selecting includes metadata in a model scoring results control table, the model scoring results control table being related to a data set control table including data set metadata;

means for reading a scoring output data record from the selected model scoring results table;

means for storing the scoring output data record in a managed representation table for scoring results, the managed representation table for scoring results comprising an identification number for each record in the selected model scoring results table and model scoring results data from the selected model scoring results table;

means for selecting a model training results file, wherein the means for selecting includes metadata in a mining model control table, the mining model control table being related to the data set control table and the model scoring results control table;

means for reading training results data from the selected model training results file; and means for storing the training results data in at least one model training results table, the at least one model training results table comprising a relational representation of the training results data from the selected model training results file, one of the at least one model training results table referencing the mining model control table, the managed representation table for scoring results being related to the referencing model training results table, the data set control table, the mining model control table, and the model scoring results control table.

28. The system of claim 27 wherein the data set control table comprises:
an identification number for each data set;
a name for each data set;
a description for each data set;
a type for each data set;
a usage for each data set; and
a location for each data set.

29. The system of claim 27 wherein the mining model control table comprises:
an identification number for the data mining model;
a model name for the data mining model;
a description for the data mining model;
a model type for the data mining model;
an algorithm used for training the data mining model;
an identification number for a model training input data set used by the data mining tool to train the data mining model;
a date the data mining model was last trained;
an identification number for a model training results file for the data mining model;
a file name for the model training results file for the data mining model; and
a file location for the model training results file for the data mining model.

30. The system of claim 27 wherein the model scoring results control table comprises:
an identification number for each model scoring results table;
an identification number for the data mining model used for the model scoring results table;
an identification number for a scoring input data set for the model scoring results table;
a name for the model scoring results table;
a name for a scoring setting; and
a scoring status indicating whether the model scoring results table is actively used.

31. The system of claim 27 wherein the managed representation table for scoring results comprises:
an identification number for each data mining model used for scoring;
an identification number for each scoring input data set; and
an identification number for each model scoring results table.

32. The system of claim 31, wherein the data mining model is a clustering model and the data mining tool scores scoring input data sets using the clustering model to produce scoring output data records, to establish clusters, to select from the clusters a best fitting cluster and a second best fitting cluster, to score the fitting quality of each record to the best fitting cluster, to score the fitting quality of each record to the second best fitting cluster, and to establish a confidence value of the cluster assignment of each record, the managed representation table for scoring results further comprising for each record:
a numerical index for the best fitting cluster;
a score of the fitting quality of the record to the best fitting cluster;
a numerical index for the second best fitting cluster;
a score of the fitting quality of the record to the second best filling cluster; and
a confidence value of the cluster assignment of the record.

33. The system of claim 31, wherein the data mining model is a clustering model and the data mining tool scores scoring input data sets using the clustering model to produce scoring output data records, and wherein the managed representation table further comprises a model identification column in the managed representation table for scoring results in which is stored content from the clustering model identification column in the at least one model training results table, the managed representation table for scoring results relating to the at least one model training result table through the managed representation table model identification column.

34. The system of claim 31, wherein:
each model scoring results table further comprises a record identification number column in which is stored an identification number for each record in the model scoring results table; and
the managed representation table for scoring results further comprises a record identification column in which the identification number for each record from each selected model scoring results table is stored, the identification numbers being those identification numbers stored in the model scoring results table record identification column.

35. The system of claim 27 wherein the selected model training results file comprises a hierarchical representation of the model training results.

36. The system of claim 27 wherein:
the data mining model is a clustering model;
the selected model training results file comprises a hierarchical representation of model training results; and
the at least one model training results table comprises a clustering table, a cluster table, a cluster attribute table and a cluster attribute bin table, and
means for reading the training results data from the selected model training results file in a model training results table further comprises:

means for reading, from a hierarchical clustering node embodied in the hierarchical representation of model training results, clustering data describing a clustering, and means for storing the clustering data in a relational clustering record in the clustering table, wherein the relational clustering record includes a clustering identification field in which is stored content from a model identification field in the mining model control table, the clustering table relating to the mining model control table through the clustering identification field; and the managed representation table comprises a model identification field in which is stored content from the clustering identification field in the clustering table and from a model identification field in the mining model control table, the managed representation table for scoring results relating to the clustering table and to the mining model control table through the managed representation table model identification field;

means for reading, from a hierarchical cluster node embodied in the hierarchical representation of model training results, cluster data describing a cluster, and means for storing the cluster data in a relational cluster record in the cluster table, wherein the hierarchical cluster node is embodied in a position in the hierarchy below the hierarchical clustering node;

the relational cluster record is related to the relational clustering record through a first foreign key comprising the clustering identification field; and the relational cluster record includes a cluster identification field;

means for reading, from a hierarchical cluster attribute node embodied in the hierarchical representation of model training results, cluster attribute data describing a cluster attribute, and means for storing the cluster attribute data in a relational cluster attribute record in the cluster attribute table, wherein the hierarchical cluster attribute node is embodied in a position in the hierarchy below the hierarchical cluster node;

the relational cluster attribute record is related to the relational cluster record through a second foreign key comprising the cluster identification field;

the relational cluster attribute record is related to the relational clustering record through a third foreign key comprising the clustering identification field; and the relational cluster attribute record includes a cluster attribute identification field;

means for reading, from a hierarchical cluster attribute bin node embodied in the hierarchical representation of model training results, cluster attribute bin data describing a cluster attribute bin, and means for storing the cluster attribute bin data in a relational cluster attribute bin record in the cluster attribute bin table, wherein the hierarchical cluster attribute bin node is embodied in a position in the hierarchy below the hierarchical cluster attribute node;

the relational cluster attribute bin record is related to the relational cluster attribute record through a fourth foreign key comprising the cluster attribute identification field;

the relational cluster attribute bin record is related to the relational cluster record through a fifth foreign key comprising the cluster identification field; and the relational cluster attribute bin record is related to the relational clustering record through a sixth foreign key comprising the clustering identification field.

37. The system of claim 36 wherein the clustering data as recorded in the relational clustering record comprises:

a unique identifier for the relational clustering record;

a text name for the relational clustering record;

a text description of the purpose of a clustering represented by the relational clustering record;

a clustering type;

a number of clusters given by the clustering;

a number of attributes considered in the clustering;

an algorithm field identifying the clustering algorithm used in the clustering; and an items numeric field that stores the number of data items input to the clustering from the scoring input data set.

38. The system of claim 36 wherein the cluster data as recorded in the relational cluster record comprises:

a unique identifier for the cluster;

a unique identifier of a relational clustering record to which the relational cluster record related;

an ordinal number of the relational cluster record;

a text name for the cluster represented by the relational cluster record;

a text description of the purpose of the cluster represented by the relational cluster record; and a numeric field identifying the number of data items from the scoring input data set that are represented in records related to the relational cluster record.

39. The system of claim 36 wherein the cluster attribute data as recorded in the relational cluster attribute record comprises:

a unique identifier of the relational cluster attribute record;

a unique identifier of a relational clustering record to which the relational cluster attribute record is related;

a unique identifier of a relational cluster record to which the relational cluster attribute record is related;

an attribute type;

a text name of a relational cluster attribute represented by the relational cluster attribute record;

a text description of the relational cluster attribute;

a use type field;

a categories numeric field indicating a number of categories associated with the cluster attribute when the attribute type has the value "categorical;"

a lowest value numeric field indicating a lowest value allowed when the attribute type has the value "continuous;"

a highest value numeric field indicating a highest value allowed when the attribute type has the value "continuous;"

an items numeric field identifying the number of data items from the scoring input data set that are represented in records related to the relational cluster attribute record.

40. The system of claim 36 wherein the cluster attribute bin data as recorded in the relational cluster attribute bin record comprises:

a unique identifier of the attribute bin;

a unique identifier of a relational clustering record to which the relational attribute bin record is related;

a unique identifier of a relational cluster record to which the relational attribute bin record is related;

a unique identifier of a relational attribute record to which the relational attribute bin record is related;

a text name for the attribute bin represented by the relational attribute bin record;

a category name;

a lowest value numeric field in which is stored the lowest value in the bin;

a highest value numeric record in which is stored the highest value in the bin;

an items numeric field in which is stored the number of items in the bin;

a values sum numeric field in which is stored the sum of the values in the bin; and a squares numeric field in which is stored the sum of the squares of values in the bin.

41. The system of claim 27, wherein:

the mining model control table is related to the data set control table through a mining model control table data set foreign key;

the model scoring results table is related to the data set control table through a model scoring results table data set foreign key and to the mining model control table through a model scoring results table mining model foreign key;

the managed representation table for scoring results is related to the data set control table through a managed representation table data set foreign key, to the mining model control table through a managed representation table mining model foreign key, and to the model scoring results control table through a managed representation table model scoring results foreign key; and the referencing model training results table references the mining model control table through a model training results table foreign key, and the managed representation table for scoring results is related to the referencing model training results table through a managed representation table training results foreign key.

42. The system of claim 41, wherein the mining model control table foreign key comprises a model training input data set identification column in the mining model control table in which is stored content from a data set identification column of the data set control table, the mining model control table relating to the data set control table through the foreign key.

43. The system of claim 41, wherein the mining model control table foreign key comprises a model training results file identification column in the mining model control table in which is stored content from a data set identification column of the data set control table, the mining model control table relating to the data set control table through the foreign key.

44. The system of claim 41, wherein the model scoring results control table data set foreign key comprises a model scoring results table identification column in the model scoring results control table in which is stored content from a data set identification column of the data set control table, the model scoring results control table relating to the data set control table through the foreign key.

45. The system of claim 41, wherein the model scoring results control table data set foreign key comprises a scoring input data set identification column in the model scoring results control table in which is stored content from a data set identification column of the data set control table, the model scoring results control table relating to the data set control table through the foreign key.

46. The system of claim 41, wherein the model scoring results control table mining model foreign key comprises a model identification column in the model scoring results control table in which is stored content from a model identification column of the mining model control table, the model scoring results control table relating to the mining model control table through the foreign key.

47. The system of claim 41, wherein the managed representation table data set foreign key comprises a model scoring input data set identification column in the managed representation table for scoring results in which is stored content from a data set identification column of the data set control table, the managed representation table for scoring results relating to the data set control table through the managed representation table data set foreign key.

48. The system of claim 41, wherein the managed representation table mining model foreign key comprises a model identification column in the managed representation table for scoring results in which is stored content from a model identification column of the mining model control table, the managed representation table for scoring results relating to the mining model control table through the managed representation table mining model foreign key.

49. The system of claim 41, wherein the managed representation table model scoring results foreign key comprises:

a scoring input data set identification column in the managed representation table for scoring results in which is stored content from a scoring input data set identification column of the model scoring results control table, a model identification column in the managed representation table for scoring results in which is stored content from a model identification column of the model scoring results control table, and a model scoring results table identification column in the managed representation table for scoring results in which is stored content from a model scoring results table identification column of the model scoring results control table, the managed representation table for scoring results relating to the model scoring results control table through the managed representation table model scoring results foreign key.

50. The system of claim 41, wherein the model training results table foreign key comprises a model identification column in one of the at least one model training results table in which is stored content from a model identification column of the mining model control table, the model training results table relating to the mining model control table through the model training results table foreign key.

51. The system of claim 41, wherein the managed representation table training results foreign key comprises a model identification column in the managed representation table for scoring results in which is stored content from a model identification column in one of the at least one model training results tables.

52. The system of claim 27, wherein the model training results file is in Predictive Model Markup Language format.

53. A computer program product for managing data mining activities in a data mining environment, the data mining environment having data sets, a data mining tool, a data mining model, model training results stored in model training results files, and scoring output data stored in records in model scoring results tables, the computer program product comprising:

a recording medium;

means, recorded on the recording medium, for selecting a model scoring results table, wherein the means for selecting includes metadata in a model scoring results control table, the model scoring results control table being related to a data set control table including data set metadata;

means, recorded on the recording medium, for reading a scoring output data record from the selected model scoring results table;

means, recorded on the recording medium, for storing the scoring output data record in a managed representation table for scoring results, the managed representation table for scoring results comprising an identification number for each record in the selected model scoring results table and model scoring results data from the selected model scoring results table;

means, recorded on the recording medium, for selecting a model training results file, wherein the means for selecting includes metadata in a mining model control table, the mining model control table being related to the data set control table and the model scoring results control table;

means, recorded on the recording medium, for reading training results data from the selected model training results file; and means, recorded on the recording medium, for storing the training results data in at least one model training results table, the at least one model training results table comprising a relational representation of the training results data from the selected model training results file, one of the at least one model training results table referencing the mining model control table, the managed representation table for scoring results being related to the referencing model training results table, the data act control table, the mining modal control table, and the model scoring results control table.

54. The computer program product of claim 53 wherein the data set control table comprises:
an identification number for each data set;
a name for each data set;
a description for each data set;
a type for each data set;
a usage for each data set; and
a location for each data set.

55. The computer program product of claim 53 wherein the mining model control table comprises:
an identification number for the data mining model;
a model name for the data mining model;
a description for the data mining model;
a model type for the data mining model;
an algorithm used for training the data mining model;
an identification number for a model training input data set used by the data mining tool to train the data mining model;
a date the data mining model was last trained;
an identification number for a model training results file for the data mining model;
a file name for the model training results file for the data mining model; and
a file location for the model training results file for the data mining model.

56. The computer program product of claim 53 wherein the model scoring results control table comprises:
an identification number for each model scoring results table;
an identification number for the data mining model used for the model scoring results table;

an identification number for a scoring input data set for the model scoring results table;
a name for the model scoring results table;
a name for a scoring setting; and
a scoring status indicating whether the model scoring results table is actively used.

57. The computer program product of claim 53 wherein the managed representation table for scoring results comprises:
an identification number for each data mining model used for scoring;
an identification number for each scoring input data set; and
an identification number for each model scoring results table.

58. The computer program product of claim 57, wherein the data mining model is a clustering model and the data mining tool scores scoring input data sets using the clustering model to produce scoring output data records, to establish clusters, to select from the clusters a best fitting cluster and a second best fitting cluster, to score the fitting quality of each record to the best fitting cluster, to score the fitting quality of each record to the second best fitting cluster, and to establish a confidence value of the cluster assignment of each record, the managed representation table for scoring results further comprising for each record:
a numerical index for the best fitting cluster;
a score of the fitting quality of the record to the best fitting cluster;
a numerical index for the second best fitting cluster;
a score of the fitting quality of the record to the second best filling cluster; and
a confidence value of the cluster assignment of the record.

59. The computer program product of claim 57, wherein the data mining model is a clustering model and the data mining tool scores scoring input data sets using the clustering model to produce scoring output data records, and wherein the managed representation table further comprises a model identification column in the managed representation table for scoring results in which is stored content from the clustering model identification column in the at least one model training results table, the managed representation table for scoring results relating to the at least one model training result table through the managed representation table model identification column.

60. The computer program product of claim 57, wherein:
each model scoring results table further comprises a record identification number column in which is stored an identification number for each record in the model scoring results table; and
the managed representation table for scoring results further comprises a record identification column in which the identification number for each record from each selected model scoring results table is stored, the identification numbers being those identification numbers stored in the model scoring results table record identification column.

61. The computer program product of claim 53 wherein the selected model training results file comprises a hierarchical representation of the model training results.

62. The computer program product of claim 53 wherein:
the data mining model is a clustering model;
the selected model training results file comprises a hierarchical representation of model training results; and the at least one model training results table comprises a clustering table, a cluster table, a cluster attribute table and a cluster attribute bin table, and means, recorded on the recording medium, for reading the training results data from the selected model training results file in a model training results table further comprises:

means, recorded on the recording medium, for reading, from a hierarchical clustering node embodied in the hierarchical representation of model training results, clustering data describing a clustering, and means, recorded on the recording medium, for storing the clustering data in a relational clustering record in the clustering table, wherein the relational clustering record includes a clustering identification field in which is stored content from a model identification field in the mining model control table, the clustering table relating to the mining model control table through the clustering identification field; and the managed representation table comprises a model identification field in which is stored content from the clustering identification field in the clustering table and from a model identification field in the mining model control table, the managed representation table for scoring results relating to the clustering table and to the mining model control table through the managed representation table model identification field;

means, recorded on the recording medium, for reading, from a hierarchical cluster node embodied in the hierarchical representation of model training results, cluster data describing a cluster, and means, recorded on the recording medium, for storing the cluster data in a relational cluster record in the cluster table, wherein the hierarchical cluster node is embodied in a position in the hierarchy below the hierarchical clustering node;

the relational cluster record is related to the relational clustering record through a first foreign key comprising the clustering identification field; and the relational cluster record includes a cluster identification field;

means, recorded on the recording medium, for reading, from a hierarchical cluster attribute node embodied in the hierarchical representation of model training results, cluster attribute data describing a cluster attribute, and means, recorded on the recording medium, for storing the cluster attribute data in a relational cluster attribute record in the cluster attribute table, wherein the hierarchical cluster attribute node is embodied in a position in the hierarchy below the hierarchical cluster node;

the relational cluster attribute record is related to the relational cluster record through a second foreign key comprising the cluster identification field;

the relational cluster attribute record is related to the relational clustering record through a third foreign key comprising the clustering identification field; and the relational cluster attribute record includes a cluster attribute identification field;

means, recorded on the recording medium, for reading, from a hierarchical cluster attribute bin node embodied in the hierarchical representation of model training results, cluster attribute bin data describing a cluster attribute bin, and means, recorded on the recording medium, for storing the cluster attribute bin data in a relational cluster attribute bin record in the cluster attribute bin table, wherein the hierarchical cluster attribute bin node is embodied in a position in the hierarchy below the hierarchical cluster attribute node;

the relational cluster attribute bin record is related to the relational cluster attribute record through a fourth foreign key comprising the cluster attribute identification field;

the relational cluster attribute bin record is related to the relational cluster record through a fifth foreign key comprising the cluster identification field; and the relational cluster attribute bin record is related to the relational clustering record through a sixth foreign key comprising the clustering identification field.

63. The computer program product of claim 62 wherein the clustering data as recorded in the relational clustering record comprises:

a unique identifier for the relational clustering record;

a text name for the relational clustering record;

a text description of the purpose of a clustering represented by the relational clustering record;

a clustering type;

a number of clusters given by the clustering;

a number of attributes considered in the clustering;

an algorithm field identifying the clustering algorithm used in the clustering; and an items numeric field that stores the number of data items input to the clustering from the scoring input data set.

64. The computer program product of claim 62 wherein the cluster data as recorded in the relational cluster record comprises:

a unique identifier for the cluster;

a unique identifier of a relational clustering record to which the relational cluster record related;

an ordinal number of the relational cluster record;

a text name for the cluster represented by the relational cluster record;

a text description of the purpose of the cluster represented by the relational cluster record; and a numeric field identifying the number of data items from the scoring input data set that are represented in records related to the relational cluster record.

65. The computer program product of claim 62 wherein the cluster attribute data as recorded in the relational cluster attribute record comprises:

a unique identifier of the relational cluster attribute record;

a unique identifier of a relational clustering record to which the relational cluster attribute record is related;

a unique identifier of a relational cluster record to which the relational cluster attribute record is related;

an attribute type;

a text name of a relational cluster attribute represented by the relational cluster attribute record;

a text description of the relational cluster attribute;

a use type field;

a categories numeric field indicating a number of categories associated with the cluster attribute when the attribute type has the value "categorical;"

a lowest value numeric field indicating a lowest value allowed when the attribute type has the value "continuous;"

a highest value numeric field indicating a highest value allowed when the attribute type has the value "continuous;"

an items numeric field identifying the number of data items from the scoring input data set that are represented in records related to the relational cluster attribute record.

66. The computer program product of claim 62 wherein the cluster attribute bin data as recorded in the relational cluster attribute bin record comprises:

a unique identifier of the attribute bin;

a unique identifier of a relational clustering record to which the relational attribute bin record is related;

a unique identifier of a relational cluster record to which the relational attribute bin record is related;

a unique identifier of a relational attribute record to which the relational attribute bin record is related;

a text name for the attribute bin represented by the relational attribute bin record;

a category name;

a lowest value numeric field in which is stored the lowest value in the bin;

a highest value numeric record in which is stored the highest value in the bin;

an items numeric field in which is stored the number of items in the bin;

a values sum numeric field in which is stored the sum of the values in the bin; and a squares numeric field in which is stored the sum of the squares of values in the bin.

67. The computer program product of claim 53, wherein:

the mining model control table is related to the data set control table through a mining model control table data set foreign key;

the model scoring results table is related to the data set control table through a model scoring results table data set foreign key and to the mining model control table through a model scoring results table mining model foreign key;

the managed representation table for scoring results is related to the data set control table through a managed representation table data set foreign key, to the mining model control table through a managed representation table mining model foreign key, and to the model scoring results control table through a managed representation table model scoring results foreign key; and the referencing model training results table references the mining model control table through a model training results table foreign key, and the managed representation table for scoring results is related to the referencing model training results table through a managed representation table training results foreign key.

68. The computer program product of claim 67, wherein the mining model control table foreign key comprises a model training input data set identification column in the mining model control table in which is stored content from a data set identification column of the data set control table, the mining model control table relating to the data set control table through the foreign key.

69. The computer program product of claim 67, wherein the mining model control table foreign key comprises a model training results file identification column in the mining model control table in which is stored content from a data set identification column of the data set control table, the mining model control table relating to the data set control table through the foreign key.

70. The computer program product of claim 67, wherein the model scoring results control table data set foreign key comprises a model scoring results table identification column in the model scoring results control table in which is stored content from a data set identification column of the data set control table, the model scoring results control table relating to the data set control table through the foreign key.

71. The computer program product of claim 67, wherein the model scoring results control table data set foreign key comprises a scoring input data set identification column in the model scoring results control table in which is stored content from a data set identification column of the data set control table, the model scoring results control table relating to the data set control table through the foreign key.

72. The computer program product of claim 67, wherein the model scoring results control table mining model foreign key comprises a model identification column in the model scoring results control table in which is stored content from a model identification column of the mining model control table, the model scoring results control table relating to the mining model control table through the foreign key.

73. The computer program product of claim 67, wherein the managed representation table data set foreign key comprises a model scoring input data set identification column in the managed representation table for scoring results in which is stored content from a data set identification column of the data set control table, the managed representation table for scoring results relating to the data set control table through the managed representation table data set foreign key.

74. The computer program product of claim 67, wherein the managed representation table mining model foreign key comprises a model identification column in the managed representation table for scoring results in which is stored content from a model identification column of the mining model control table, the managed representation table for scoring results relating to the mining model control table through the managed representation table mining model foreign key.

75. The computer program product of claim 67, wherein the managed representation table model scoring results foreign key comprises:

a scoring input data set identification column in the managed representation table for scoring results in which is stored content from a scoring input data set identification column of the model scoring results control table, a model identification column in the managed representation table for scoring results in which is stored content from a model identification column of the model scoring results control table, and a model scoring results table identification column in the managed representation table for scoring results in which is stored content from a model scoring results table identification column of the model scoring results control table, the managed representation table for scoring results relating to the model scoring results control table through the managed representation table model scoring results foreign key.

76. The computer program product of claim 67, wherein the model training results table foreign key comprises a model identification column in one of the at least one model training results table in which is stored content from a model identification column of the mining model control table, the model training results table relating to the mining model control table through the model training results table foreign key.

77. The computer program product of claim 67, wherein the managed representation table training results foreign key comprises a model identification column in the managed representation table for scoring results in which is stored content from a model identification column in one of the at least one model training results tables.

78. The computer program product of claim 53, wherein the model training results file is in Predictive Model Markup Language format.

* * * * *